United States Patent
Iwai et al.

(10) Patent No.: US 12,435,638 B2
(45) Date of Patent: Oct. 7, 2025

(54) TURBINE SHAFT SEALING DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shogo Iwai, Ota (JP); Tomohiko Tsukuda, Yokohama (JP); Yoshifumi Iwasaki, Yokohama (JP); Tsuguhisa Tashima, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 18/779,663

(22) Filed: Jul. 22, 2024

(65) Prior Publication Data

US 2025/0207503 A1    Jun. 26, 2025

(30) Foreign Application Priority Data

Dec. 20, 2023   (JP) .................................. 2023-214548

(51) Int. Cl.
F01D 11/00     (2006.01)
(52) U.S. Cl.
CPC .......... F01D 11/001 (2013.01); F01D 11/003 (2013.01); *F05D 2240/55* (2013.01)

(58) Field of Classification Search
CPC ... F01D 11/001; F01D 11/003; F05D 2240/55
See application file for complete search history.

(56) References Cited

U.S. PATENT DOCUMENTS 6,220,603 B1 * 4/2001 Brandon ................ F16J 15/442
277/412
6,651,986 B2 * 11/2003 Chevrette ............. F16J 15/442
277/421

FOREIGN PATENT DOCUMENTS

JP              3662198 B2      6/2005

* cited by examiner

*Primary Examiner* — Nathaniel E Wiehe
*Assistant Examiner* — Theodore C Ribadeneyra
(74) *Attorney, Agent, or Firm* — Oblon, McClelland, Maier &Neustadt, L.L.P.

(57) ABSTRACT

According to an embodiment, a turbine shaft sealing device suppresses leakage of a working fluid between a rotary part, and a lower half stationary part and an upper half stationary. Six packing ring segments of the turbine shaft sealing device are formed of a lower half center segment and two lower half side segments, and an upper half center segment and two upper half side segments, and configure an annular packing ring having an inner peripheral ring part on which a hook that engages with a hook engagement annular groove of the lower half stationary part and the upper half stationary part, and a seal fin protruding toward the rotary part side are arranged. A biasing part is formed of a lower half center biasing part, a lower half side biasing part, an upper half side biasing part, and upper half center biasing part.

4 Claims, 15 Drawing Sheets

TURBINE SHAFT SEALING DEVICE

CROSS-REFERENCE TO RELATED APPLICATIONS

This application is based upon and claims the benefit of priority from Japanese Patent Application No. 2023-214548 filed on Dec. 20, 2023, the entire content of which is incorporated herein by reference.

FIELD

Embodiments of the present invention relate to a turbine shaft sealing device.

BACKGROUND

In a transient operation such as start or stop of a turbine, due to non-uniformity of a flow of steam in an upper half and a lower half of a turbine casing being a stationary part, a temperature difference between an upper direction and a lower direction may occur. Due to this temperature difference, the entire casing is subjected to thermal deformation in a shape of a bow in a vertically upper direction or lower direction, resulting in that a contact risk between a rotary part and the stationary part increases at upper and lower portions between the rotary part and the stationary part. Further, a rotation speed changes when activating or stopping a turbine, and when it passes through a natural frequency of a turbine rotor, resonance occurs and a vibration of the turbine rotor increases. Due to such a phenomenon, there is a case where the rotary part and the stationary part are brought into contact with each other at the upper and lower portions between the rotary part and the stationary part.

When the contact of a turbine shaft seal occurs in the upper and lower direction, there is a risk that heat generation due to friction occurs and a temperature of a rotor locally increases to cause heat bending, which causes a shaft vibration. In order to reduce the heat generation due to friction, it is important to reduce a reaction force from the stationary part to the rotary part, namely, a force of pushing back the rotary part when the rotary part and the stationary part are brought into contact with each other.

FIG. 14 is a partial vertical sectional view illustrating a conventional configuration example of a turbine shaft sealing device.

A turbine shaft sealing device is arranged between a rotary part 10 and a stationary part 20. In the conventional configuration, the turbine shaft sealing device is formed of an annular packing ring 30 held by the stationary part 20 and arranged to surround the rotary part 10, and a support key and respective springs to be described later, which are illustrated in FIG. 15. Here, the spring is a coil spring, a leaf spring, or another biasing means (biasing part) having an elastic force.

The packing ring 30 has an annular inner peripheral ring part 35 as a radially inner portion, and an outer peripheral ring part 39 as a radially outer portion.

To an inner peripheral surface of the inner peripheral ring part 35, there is provided a seal fin 38 for reducing a flow rate of a working fluid that passes through a gap between the rotary part 10 and the packing ring 30. Note that in FIG. 14, a case is exemplified in which a plurality of projections are formed, in an axial direction, on an outer peripheral surface 10a of the rotary part 10 facing the inner peripheral surface of the inner peripheral ring part 35, but there is also a case wherein the projections are not formed.

The outer peripheral ring part 39 engages with a hook engagement annular groove 23 formed on the stationary part 20, and accordingly, the packing ring 30 is stationarily supported by the stationary part 20. An upstream-side portion of the outer peripheral ring part 39 forms a front hook 36. Further, a downstream-side portion of the outer peripheral ring part 39 forms a rear hook 37. Meanwhile, the stationary part 20 has an annular groove front projection 24 and an annular groove rear projection 25 at positions in front of and behind an entrance of the hook engagement annular groove 23 at an inner peripheral surface 20a of the stationary part 20. As for the movement of the packing ring 30 toward the radially inner side, a minimum gap is kept for making the seal fin 38 and the rotary part 10 not to be brought into contact with each other, in a manner that a front hook inner peripheral surface 36a of the front hook 36 is brought into contact with a front projection outer peripheral surface 24a of the annular groove front projection 24, and a rear hook inner peripheral surface 37a of the rear hook 37 is brought into contact with a rear projection outer peripheral surface 25a of the annular groove rear projection 25. Note that a sealing function by the rear hook inner peripheral surface 37a of the rear hook 37 and the rear projection outer peripheral surface 25a of the annular groove rear projection 25 is essential.

From a viewpoint of assembling performance, the packing ring 30 generally has a structure of being divided in a circumferential direction. FIG. 14 illustrates a partial sectional longitudinal view of each packing ring segment 50a as a divided element of the packing ring 30.

Next, a configuration in the circumferential direction of the divided structure will be explained. Note that the stationary part 20 is also structured to be divided in the circumferential direction, in a similar manner, from the viewpoint of assembling performance, and generally, it is divided in the upper and lower direction.

FIG. 15 is a transverse sectional view illustrating a conventional configuration example of the turbine shaft sealing device. Note that FIG. 15 illustrates a state where the rotary part 10 is moved further downward when compared to a normal state, for the sake of later explanation.

As illustrated in FIG. 15, the packing ring 30 is formed of four packing ring segments 50a divided in the circumferential direction. Specifically, the packing ring 30 is formed of two lower half segments 51 arranged below a horizontal dividing surface 20h of the stationary part 20, and two upper half segments 52 arranged above the horizontal dividing surface 20h of the stationary part 20. Each of these four segments has a circumferential angle of 90 degrees in the circumferential direction.

Note that the stationary part 20 is divided into a lower half stationary part 20u and an upper half stationary part 20v. A lower end portion of each of the two upper half segments 52 is supported by a support key 40 attached to an upper half horizontal joint surface 22 of the upper half stationary part 20v of the stationary part 20. Further, an interval between mutual end surfaces in the circumferential direction of the two upper half segments 52 is adjusted by the support key 40.

On the side close to a bottom portion of each of the two lower half segments 51, two spring housing holes 51h formed toward a rotation center axis CL are formed, and in each of the spring housing holes 51h, a lower half spring 51s that biases the lower half segment 51 toward the rotation center axis CL, is housed.

A biasing force of the lower half spring 51s is set to be slightly larger by Δf1 than a weight of the lower half segment 51. As a result of this, a minimum gap between each lower half segment 51 and the rotary part 10 is secured in a state that there is no contact with the rotary part 10. On the other hand, when the rotary part 10 is brought into contact with the two lower half segments 51, the two segments 51 can easily escape (move) toward the radially outer side, and thus excessive friction does not occur. Specifically, a difference between a total value of the biasing forces of the two lower half springs 51s and a total value of the weights of the two lower half segments 51, is set to be smaller than a force received when the contact of the rotary part 10 occurs.

On each of the two upper half segments 52, one spring housing hole 52h formed toward the rotation center axis CL is formed, and in each of the spring housing holes 52h, an upper half spring 52s that biases the upper half segment 52 toward the rotation center axis CL, is housed. Further, in an end surface of one upper half segment 52 at a boundary with the other upper half segment 52, a spring housing hole 52a is formed in a direction perpendicular to the end surface. In the spring housing hole 52a, an upper half auxiliary spring 52j, which operates in a direction of coupling the two upper half segments 52, is housed.

When the rotary part 10 is brought into contact with the two upper half segments 52 at a top portion and the contact portion is further enlarged in the circumferential direction, the upper half auxiliary spring 52j easily expands, resulting in that the two upper half segments 52 can separate in the circumferential direction, and excessive friction does not occur. Specifically, a biasing force of the upper half auxiliary spring 52j is set to be smaller by Δf2 than a force received when the contact of the rotary part 10 occurs.

As described above, the biasing force F1 of the lower half spring 51s provided on the side close to the bottom portion, is set to be slightly larger by Δf1 than the weight W1 of the lower half segment 51. The reason why the biasing force is set to be larger, even slightly than the weight of the lower half segment 51, is for returning, in the end, the lower half segment 51 to the original position when the contact of the rotary part 10 is eliminated.

As a result of this, when the rotary part 10 is brought into contact with the two lower half segments 51 in a direction of the bottom portion, the rotary part 10 receives the force of Δf1 from each of the two lower half segments 51. There is a case where the heat generation due to friction is caused by the contact between the rotary part 10 and the two lower half segments 51, and a temperature of the rotary part 10 locally increases to cause heat bending, which causes a shaft vibration.

Further, when the contact state is eliminated, the lower half segment 51 tries to return to its original position with the use of the spring force of the lower half spring 51s, but the lower half segment 51 that is once slid off in the vertically lower direction due to its own weight sometimes cannot completely return to its original position since the movement thereof is restricted or it is stuck due to friction between adjacent lower half segments 51.

Further, regarding the two upper half segments 52 in the upper direction, the reason why the biasing force of the upper half auxiliary spring 52j is set to be smaller by Δf2 than the force received when the contact of the rotary part 10 occurs, is for returning, in the end, the upper half segments 52 to their original positions when the contact of the rotary part 10 is eliminated.

Further, regarding the two upper half segments 52 in the upper direction as well, when they are brought into contact with the rotary part 10, there is a case where the rotary part 10 receives a reaction force due to the separation of the two upper half segments 52 in the circumferential direction, heat generation due to friction occurs and a temperature of the rotary part 10 locally increases to cause heat bending, which causes a shaft vibration.

Further, when the top portion of the rotary part 10 is brought into contact with the two upper half segments 52, each of the two upper half segments 52 performs a pivot operation around the support key 40 as a fulcrum. When, after that, the contact state is eliminated, there is a risk that a bearing surface of the upper half auxiliary spring 52j and a circumferential end surface of one of the upper half segments 52 are partially brought into contact with each other to hinder the movement of the upper half segment 52. Or, there was another risk that the circumferential end surfaces of the respective two upper half segments 52 are partially brought into contact with each other to hinder the movement of the upper half segments 52, resulting in that the upper half segments do not return to their original positions.

As described above, in the conventional structure, there is a problem that, when the rotary part 10 is brought into contact with the two lower half segments 51 or the two upper half segments 52, the frictional heat due to the force received by these segments causes the vibration of the rotary part 10. Further, there is a problem that the sealing performance deteriorates since the two lower half segments 51 or the two upper half segments 52 do not return to their original positions after they are brought into contact with the rotary part 10.

DETAILED DESCRIPTION

Figure 1:
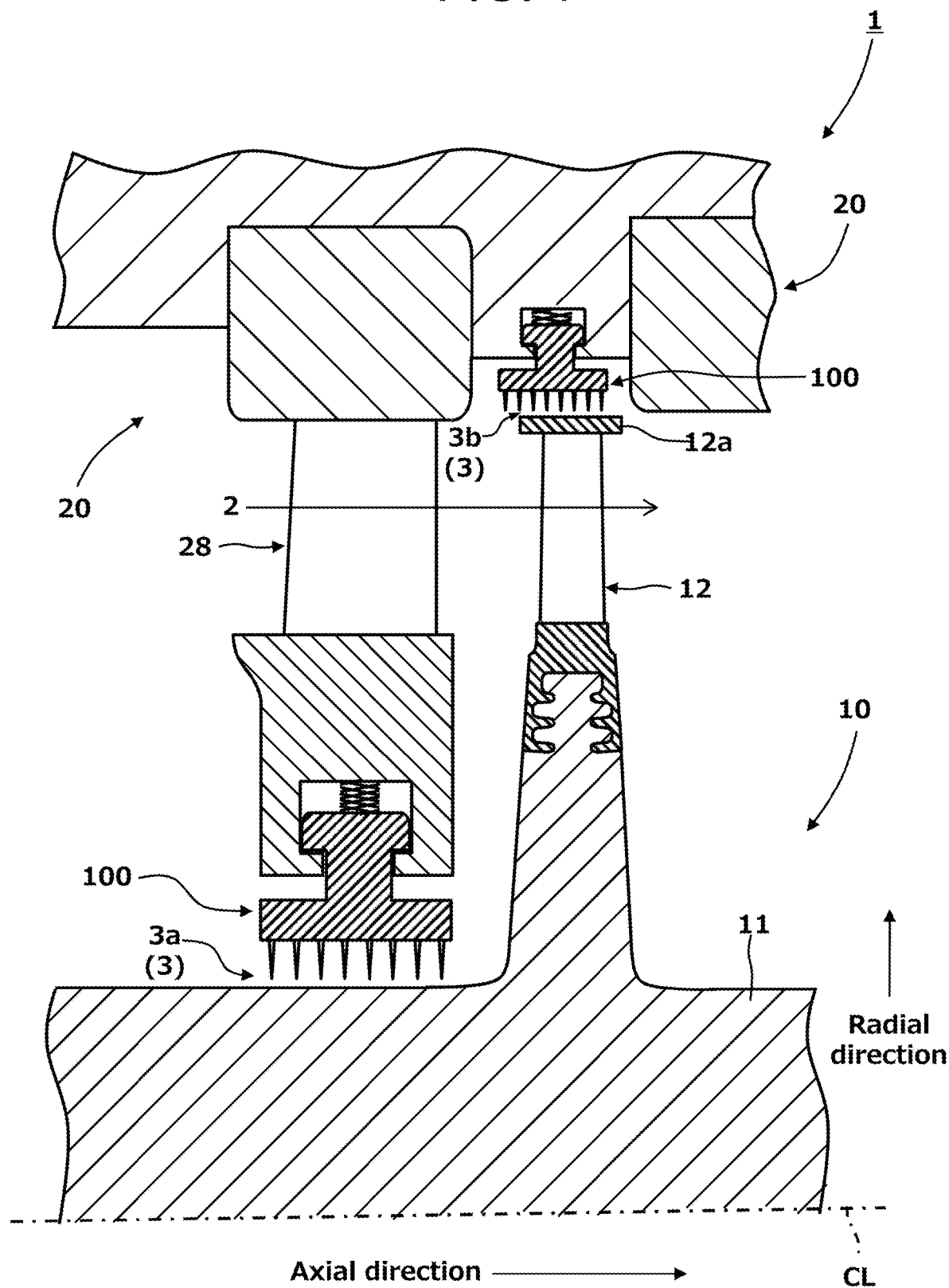
FIG. 1 is a conceptual partial sectional longitudinal view including a rotation center axis of a turbine, for explaining a rotary part and a stationary part of the turbine.

A problem to be solved by the present invention is to provide a turbine shaft sealing device capable of reducing a force that a rotary part of a turbine receives when the rotary part is brought into contact with a packing ring segment, to thereby suppress a shaft vibration of the rotary part.

According to an aspect of the present invention, there is provided a turbine shaft sealing device provided in a turbine for suppressing leakage of a working fluid between a rotary part that rotates around a rotation center axis by the working fluid, and a lower half stationary part and an upper half stationary part that are arranged to annularly surround the rotary part and that adhere to each other at respective horizontal joint surfaces, the turbine shaft sealing device comprising a packing ring lower half part and a packing ring upper half part configuring an annular packing ring having a hook and an inner peripheral ring part, the hook engaging with a hook engagement annular groove that is formed along a circumferential direction on the lower half stationary part and the upper half stationary part, inner peripheral ring part having at least one seal fin that protrudes toward a surface of the rotary part and that is formed along the circumferential direction, wherein: the packing ring lower half part is stationarily supported by the lower half stationary part; the packing ring lower half part has: a lower half center segment arranged at a center in the circumferential direction of the lower half; and two lower half side segments arranged on both sides in the circumferential direction of the lower half center segment, and each having one circumferential end portion facing a circumferential end portion of the lower half center segment; the packing ring upper half part is stationarily supported by the upper half stationary part; the packing ring upper half part has: an upper half center segment arranged at a center portion in the circumferential direction of the upper half; and two upper half side segments arranged on both sides in the circumferential direction of the upper half center segment, and each having one circumferential end portion facing a circumferential end portion of the upper half center segment, and the other end portion supported by a support plate provided to the horizontal joint surface of the upper half stationary part; and the turbine shaft sealing device further comprises: a lower half center biasing part to perform biasing the lower half center segment toward a radially inner side; a lower half side biasing part to perform biasing each of the two lower half side segments toward the radially inner side; an upper half side biasing part to perform biasing each of the two upper half side segments toward the radially inner side; and two upper half center biasing part that are provided between the upper half center segment and the respective two upper half side segments, and that is configured to perform biasing toward the upper half center segment in a direction of making the upper half center segment and the respective two upper half side segments adhere to each other.

Hereinafter, a turbine shaft sealing device according to embodiments of the present invention will be explained while referring to the drawings. Here, mutually the same or similar parts will be denoted by common reference signs, and an overlapped explanation will be omitted.

First Embodiment

FIG. 1 is a conceptual partial sectional longitudinal view including a rotation center axis CL of a turbine 1, for explaining a rotary part 10 and a stationary part 20 of the turbine.

The turbine 1 has the rotary part 10 rotatably supported by a not-illustrated bearing, and the stationary part 20 arranged so as to surround a radially outer side of the rotary part 10. The rotary part 10 has a rotor 11 extending in an axial direction, and a plurality of rotor blade cascades 12 attached to the rotor 11, provided along the circumferential direction, and arranged in the axial direction with an interval therebetween. Further, to an inner peripheral surface of the stationary part 20, a stationary blade cascade 28 as a part of the stationary part 20 is provided on an upstream side of each of the rotor blade cascades 12. A working fluid such as steam or gas introduced into the turbine 1 performs work while passing through an annular main flow path 2 that is formed by the stationary blade cascade 28 and the rotor blade cascade 12, and then flows out of the turbine 1. Hereinafter, an upstream side and a downstream side of the flow of the working fluid are sometimes referred to as a front side and a rear side, respectively.

Meanwhile, a gap is provided between an inner peripheral surface of the stationary blade cascade 28 and the rotor 11, and by this gap, an annular first leakage flow path 3a being a bypass flow path of the main flow path 2 is formed. Further, a gap in a radial direction is provided between the rotor blade cascade 12 and the inner peripheral surface of the stationary part 20 as well, and by this gap, an annular second leakage flow path 3b being a bypass flow path of the main flow path 2 is formed. As above, by providing the gaps for preventing the contact between the rotary part 10 and the stationary part 20, the annular leakage flow paths 3 having a width in the axial direction, such as the first leakage flow path 3a and the second leakage flow path 3b, are formed.

To such a leakage flow path 3, a shaft sealing device 100 for reducing a leakage flow rate of the flow path is provided. Accordingly, a leakage flow of the working fluid is suppressed, to thereby suppress a reduction in efficiency of an axial flow turbine. In an axial flow turbine installed in a power generation plant or the like, a labyrinth sealing device is generally used as a sealing device.

Meanwhile, in a transient operation such as start or stop, a shaft sealing device is required of another function. In a process of start or stop, a turbine internal pressure is not so high when compared to that during a rated operation or a partial load operation, and thus a difference in pressure in front of and behind the shaft sealing device is also small. In such a state, a force of pressing the device toward the inside diameter side by the pressure is weak, and the shaft sealing device can move in the radial direction. A turbine rotor has a natural frequency in a range of a rated rotation speed or less, and when the rotation speed passes through the natural frequency in the start process or the stop process, a shaft vibration increases. Here, the start process indicates a process in which the rotation speed is increased from a stop state of 0 rpm or a turning rotation speed of about several rpm toward the rated rotation speed, and the stop process indicates, on the contrary, a process in which the rotation speed is decreased from the rated rotation speed toward the stop state or the turning rotation speed.

When the resonance occurs, a contact risk is increased between the turbine rotor and the shaft sealing device in which a gap therebetween is narrow, and when they are brought into contact with each other, heat generation due to friction occurs in the turbine rotor and a temperature of the turbine rotor locally increases to cause heat bending, which causes a shaft vibration. Further, in the process of start or stop, a flow rate of the working fluid that flows into the turbine is small, and due to non-uniformity of the flow, a temperature difference in the upper and lower direction may occur when compared to the time during rated operation. In accordance with this, there is a case where a temperature difference occurs between an upper half and a lower half of a turbine casing, and the entire casing is deformed in a shape of a bow in a vertically upper direction or lower direction, which further increases the contact risk. For this reason, as a means of reducing the shaft vibration, the shaft seal is required of a function of reducing the heat generation due to friction in the process of start or stop.

Note that hereinafter, an explanation will be made by citing a case, as an example, in which the shaft sealing device 100 is applied to the first leakage flow path 3*a* as the leakage flow path 3, but the shaft sealing device 100 is also applicable to the second leakage flow path 3*b* in a similar manner.

Further, the shaft sealing device 100 is stationarily supported by the stationary part 20, and thus the shaft sealing device 100 is a part that stands still, but for the convenience of explanation, the shaft sealing device 100 is dealt that it is not included in the stationary part 20, hereinafter.

Figure 2:
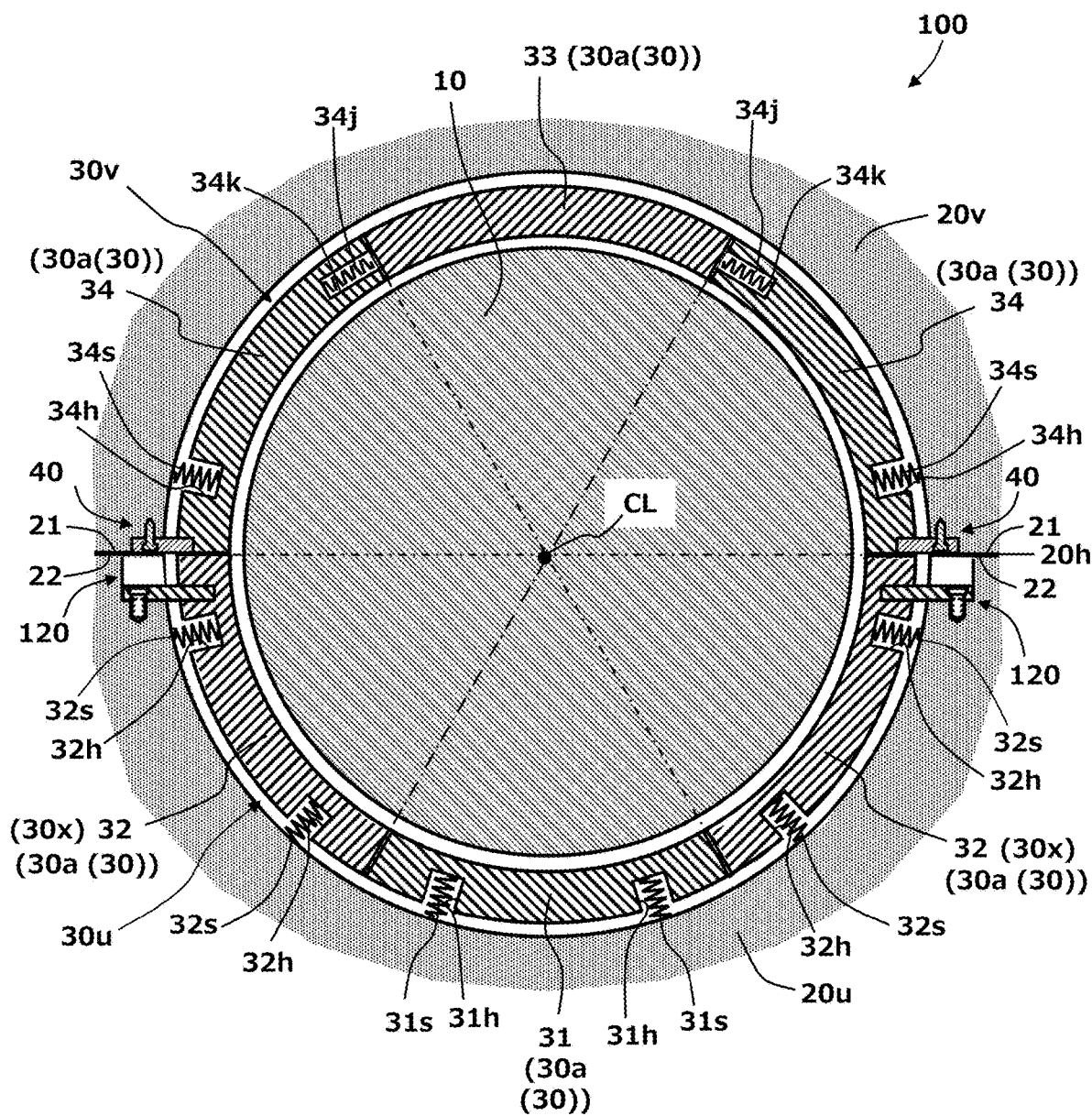
FIG. 2 is a sectional view perpendicular to the rotation center axis of the turbine, illustrating a configuration of a turbine shaft sealing device according to a first embodiment.

FIG. 2 is a sectional view perpendicular to the rotation center axis CL of the turbine 1, illustrating a configuration of a turbine shaft sealing device 100 according to the first embodiment.

The turbine shaft sealing device 100 includes a packing ring 30, and a target segment support structure 120 that supports a support target segment 30*x* to be described later.

Figure 14:
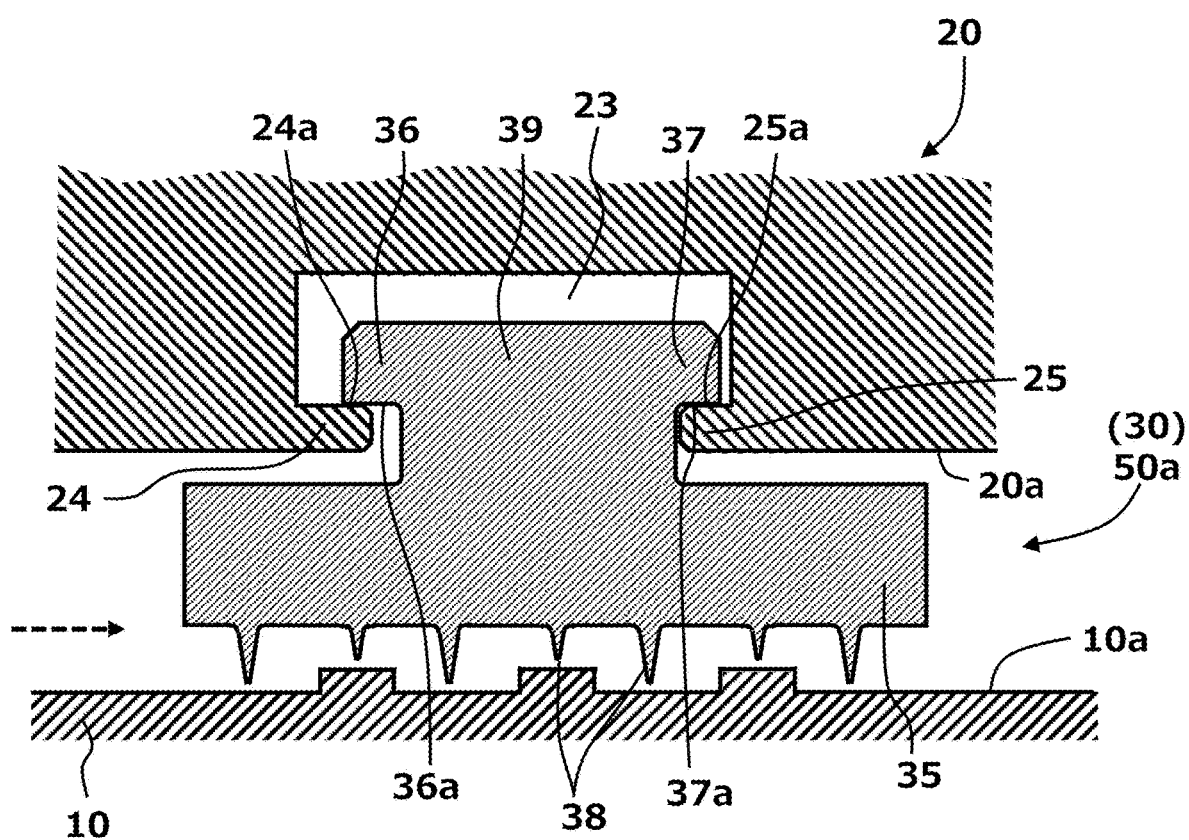
FIG. 14 is a partial sectional longitudinal view illustrating a conventional configuration example of a turbine shaft sealing device.

Here, regarding a cross-sectional shape, the packing ring 30 has a cross-sectional shape similar to that of the conventional packing ring 30 illustrated in FIG. 14. Specifically, the packing ring 30 has an annular inner peripheral ring part 35 as a radially inner portion, and an outer peripheral ring part 39 as a radially outer portion.

To an inner peripheral surface of the inner peripheral ring part 35, there is provided a seal fin 38 for reducing a flow rate of a working fluid that passes through a gap between the rotary part 10 and the packing ring 30.

The outer peripheral ring part 39 engages with a hook engagement annular groove 23 formed on the stationary part 20, and accordingly, the packing ring 30 is stationary supported by the stationary part 20. An upstream-side portion of the outer peripheral ring part 39 forms a front hook 36.

Further, a downstream-side portion of the outer peripheral ring part 39 forms a rear hook 37. Meanwhile, the stationary part 20 has an annular groove front projection 24 and an annular groove rear projection 25 at positions in front of and behind an entrance of the hook engagement annular groove 23 at an inner peripheral surface 20*a* of the stationary part 20. The movement of the packing ring 30 toward the radially inner side keeps a minimum gap without making the seal fin 38 and the rotary part 10 to be brought into contact with each other, in a manner that a front hook inner peripheral surface 36*a* of the front hook 36 is brought into contact with a front projection outer peripheral surface 24*a* of the annular groove front projection 24, and a rear hook inner peripheral surface 37*a* of the rear hook 37 is brought into contact with a rear projection outer peripheral surface 25*a* of the annular groove rear projection 25. Note that a sealing function by the rear hook inner peripheral surface 37*a* of the rear hook 37 and the rear projection outer peripheral surface 25*a* of the annular groove rear projection 25 is essential.

<Explanation Regarding First Characteristic Point>

The number of division of the packing ring 30 into the packing ring segments 30*a* in the circumferential direction is not four as in the prior art but is six in the present embodiment. In other words, the packing ring has six packing ring segments 30*a*. Specifically, the packing ring 30 has a packing ring lower half part 30*u* that engages with a lower half stationary part 20*u* and is stationary supported by the lower half stationary part 20*u*, and a packing ring upper half part 30*v* that engages with an upper half stationary part 20*v* and is stationary supported by the upper half stationary part 20*v*.

The packing ring lower half part 30*u* has a lower half center segment 31 arranged at a center in the circumferential direction of the lower half, and two lower half side segments 32 arranged on both sides in the circumferential direction of the lower half center segment 31. Further, the packing ring upper half part 30*v* has an upper half center segment 33 arranged at a center in the circumferential direction of the upper half, and two upper half side segments 34 arranged on both sides in the circumferential direction of the upper half center segment 33.

The six packing ring segments 30*a* including the lower half center segment 31, the two lower half side segments 32, the upper half center segment 33, and the two upper half side segments 34 described above, form the packing ring 30 along the circumferential direction.

The total of the circumferential angle of the lower half center segment 31 and the circumferential angle of the two lower half side segments 32 is 180 degrees, and the total of the circumferential angle of the upper half center segment 33 and the circumferential angle of the two upper half side segments 34 is 180 degrees. FIG. 2 illustrates a case where the packing ring 30 is divided into the six packing ring segments 30*a* with equal degrees.

Next, an explanation will be made on a spring related to each packing ring segment 30*a*. Here, the spring is a coil spring, a leaf spring, or another biasing part having an elastic force. Further, each spring is housed in a spring housing hole formed on each packing ring segment 30*a*, and an end portion of the spring may be fixed to each spring housing hole, or it may be simply brought into contact with the deepest portion of the spring housing hole. Further, when the end portion of the spring is simply brought into contact with the deepest portion of the spring housing hole, the deepest portion of the spring housing hole may also be formed in a cone shape, for example, so as to prevent a contact position displacement.

On the lower half center segment 31, two spring housing holes 31h formed toward the rotation center axis CL are formed, and in each of the spring housing holes 31h, a lower half center spring 31s that biases the lower half center segment 31 toward the rotation center axis CL, is housed. A biasing force of the lower half center spring 31s is set to be slightly larger by ΔF1 than a weight of the lower half center segment 31. Here, as ΔF1 becomes smaller, a reaction force with respect to the rotary part 10 decreases, but the minimum value has to be secured by taking the variation in spring stiffness and temporal reduction as well into consideration. A concrete value of ΔF1 may be set based on actual performance or based on an analytical value.

On each of the two lower half side segments 32, two spring housing holes 32h formed toward the rotation center axis CL are formed, and in each of the spring housing holes 32h, a lower half side spring 32s that biases the lower half side segment 32 toward the rotation center axis CL, is housed.

To each of the upper half side segments 34, two kinds of springs are provided. First, at a portion close to a horizontal dividing surface 20h of the upper half side segment 34, a spring housing hole 34h formed toward the rotation center axis CL is formed, and in this spring housing hole 34h, an upper half side spring 34s that biases the upper half side segment 34 toward the rotation center axis CL is housed. Further, on an end surface of each of the upper half side segments 34 at a boundary with the upper half center segment 33, a spring housing hole 34k is formed in a direction perpendicular to the end surface. In the spring housing hole 34k, an upper half auxiliary spring 34j that couples the upper half side segment 34 and the upper half center segment 33, is housed.

The coupling force between the upper half side segment 34 and the upper half center segment 33, provided by the upper half auxiliary spring 34j, is set so that when the rotary part 10 is brought into contact with the upper half center segment 33 at a top portion, the upper half auxiliary spring 34j easily expands, resulting in that the upper half center segment 33 and the two upper half side segments 34 can easily separate in the circumferential direction. Specifically, the coupling force of the upper half auxiliary spring 34j is set to be smaller by ΔF2 than a force received when the contact of the rotary part 10 occurs. Here, as ΔF2 becomes small, the reaction force with respect to the rotary part 10 decreases, but the minimum value has to be secured by taking the variation in spring stiffness and temporal reduction as well into consideration. A concrete value of ΔF2 may be set based on actual performance or based on an analytical value.

An end portion on the side close to the horizontal dividing surface 20h of each of the two upper half side segments 34 is supported by a support key 40 provided to the horizontal dividing surface 20h of the upper half stationary part 20v of the stationary part 20. An interval between mutual end surfaces in the circumferential direction of each of the upper half side segments 34 and the upper half center segment 33 is adjusted by the support key 40.

Each of the two lower half side segments 32 is supported by the turbine shaft sealing device 100 provided to the horizontal dividing surface 20h of the lower half stationary part 20u of the stationary part 20.

Figure 3:
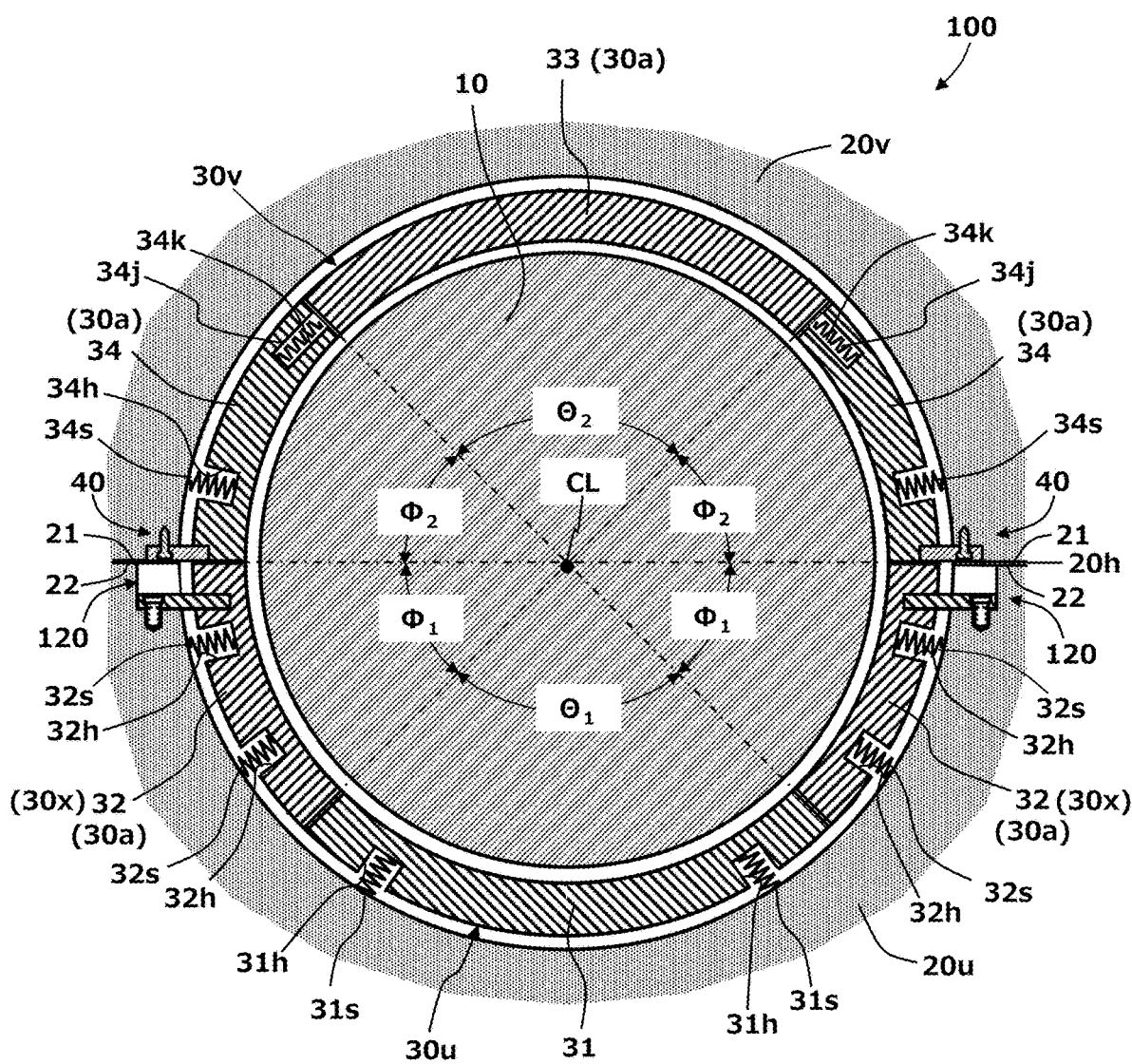
FIG. 3 is a sectional view perpendicular to the rotation center axis of the turbine, illustrating a configuration of a modified example of the turbine shaft sealing device according to the first embodiment.

FIG. 3 is a sectional view perpendicular to the rotation center axis CL of the turbine 1, illustrating a configuration of a modified example of the turbine shaft sealing device 100 according to the first embodiment.

In the modified example, the respective packing ring segments 30a divided into six pieces, are not equally divided. Specifically, the packing ring segments 30a do not have equal circumferential angles. Here, the circumferential angle is set to indicate an angle made by a plane including one end portion in the circumferential direction of the packing ring segment 30a and the rotation center axis CL, and a plane including the other end portion of the packing ring segment 30a and the rotation center axis CL. Alternatively, it is also a circumferential angle between both ends in the circumferential direction of the packing ring segment 30a in a cross section perpendicular to the axial direction, so that it may also be called a circumferential angle between both ends in the circumferential direction.

When the circumferential angle of the lower half center segment 31 is set to $\Theta_1$, the circumferential angle of the lower half side segment 32 is set to $\Phi_1$, the circumferential angle of the upper half center segment 33 is set to $\Theta_2$, and the circumferential angle of the upper half side segment 34 is set to $\Phi_2$, $(\Theta_1+2 \cdot \Phi_1)$ and $(\Theta_2+2 \cdot \Phi_2)$ are respectively 180 degrees.

The circumferential angle $\Theta_1$ of the lower half center segment 31, and the circumferential angle $\Theta_2$ of the upper half center segment 33 are respectively angles satisfying a predetermined condition.

Figure 4:
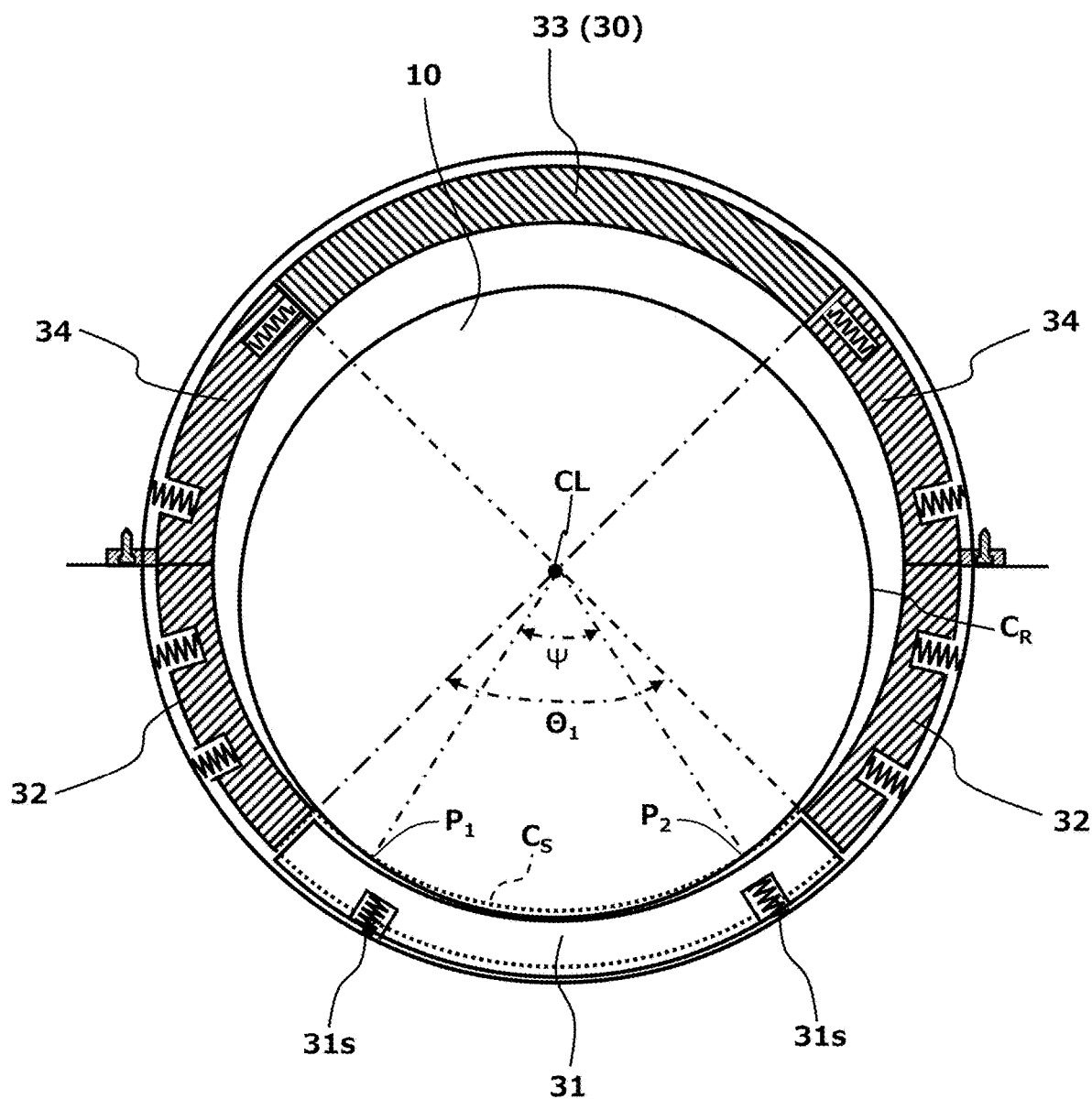
FIG. 4 is a conceptual sectional view perpendicular to the rotation center axis of the turbine, for explaining a circumferential angle of a packing ring segment in the modified example of the turbine shaft sealing device according to the first embodiment.

FIG. 4 is a conceptual sectional view perpendicular to the rotation center axis CL of the turbine, for explaining the circumferential angle of the packing ring segment 30a in the modified example of the turbine shaft sealing device 100 according to the first embodiment. Concretely, FIG. 4 is for explaining a condition of the circumferential angle $\Theta_1$ of the lower half center segment 31, and the circumferential angle $\Theta_2$ of the upper half center segment 33, and although FIG. 4 provides an explanation while exemplifying a case of the circumferential angle $\Theta_1$ of the lower half center segment 31, the explanation similarly applies also to the circumferential angle $\Theta_2$ of the upper half center segment 33.

FIG. 4 illustrates a state where the rotary part 10 is brought into contact with the lower half center segment 31, and the lower half center segment 31 is pressed downward. An outer periphery of the rotary part 10 in this state is expressed by CR, and an inner periphery of the lower half center segment 31 at an original position (a position before being pressed downward) is expressed by a dotted line Cs. A curvature radius of the outer periphery of the rotary part 10 is smaller than a curvature radius of the inner periphery of the lower half center segment 31, so that there are generated intersection points $P_1$, $P_2$ between the outer periphery CR of the rotary part 10 and the inner periphery Cs of the lower half center segment 31, as illustrated in FIG. 4.

Here, when an angle made by $P_1$-CL-$P_2$, namely, a circumferential angle between the intersection points is expressed by $\Psi$, if the circumferential angle $\Psi'$ between the intersection points is smaller than the circumferential angle $\Theta_1$ between the end portions of the lower half center segment 31, the rotary part 10 is brought into contact with only the lower half center segment 31 without being brought into contact with the lower half side segment 32. Specifically, the rotary part 10 never receives the reaction force from the lower half side segment 32. Therefore, to put it the other way around, the condition is that the circumferential angle $\Theta_1$ between the end portions of the lower half center segment 31 is larger than the circumferential angle $\Psi'$ between the intersection points.

On the other hand, if the circumferential angle $\Theta_1$ between the end portions of the lower half center segment 31 is excessively large, the weight of the lower half center segment 31 becomes large, and thus there is a need to increase the stiffness of the lower half center spring 31s. As a result of this, the reaction force that the rotary part 10 receives from the lower half center segment 31 when the rotary part 10 is brought into contact with the lower half center segment 31 and the lower half center segment 31 moves downward increases. Therefore, the circumferential angle $\Theta_1$ between the end portions of the lower half center segment 31 is preferably within a predetermined width $\Delta\Theta$ that is larger than the circumferential angle $\Psi$ between the intersection points. Specifically, it is preferable to satisfy $\Psi<\Theta_1<\Psi+\Delta\Theta$. Here, $\Delta\Theta$ may be appropriately selected to be, for example, 10 degrees, 20 degrees, or the like.

<Explanation of Operations and Effects of First Characteristic Point>

As described above, by dividing the packing ring 30 into six (upper three and lower three) packing ring segments 30a, when the rotary part 10 during operation moves in the upper and lower direction and is brought into contact with the packing ring segment 30a in the lower direction or the upper direction in particular, the rotary part 10 is brought into only one packing ring segment 30a, resulting in that the reaction force from the packing ring segment 30a can be suppressed to a small force, which enables to suppress the local temperature increase of the rotary part 10 and suppress the vibration caused thereby.

<Explanation Regarding Second Characteristic Point>

Next, a target segment support structure 120 being a second characteristic point of the present embodiment, which is different from the prior art, will be explained.

Figure 5:
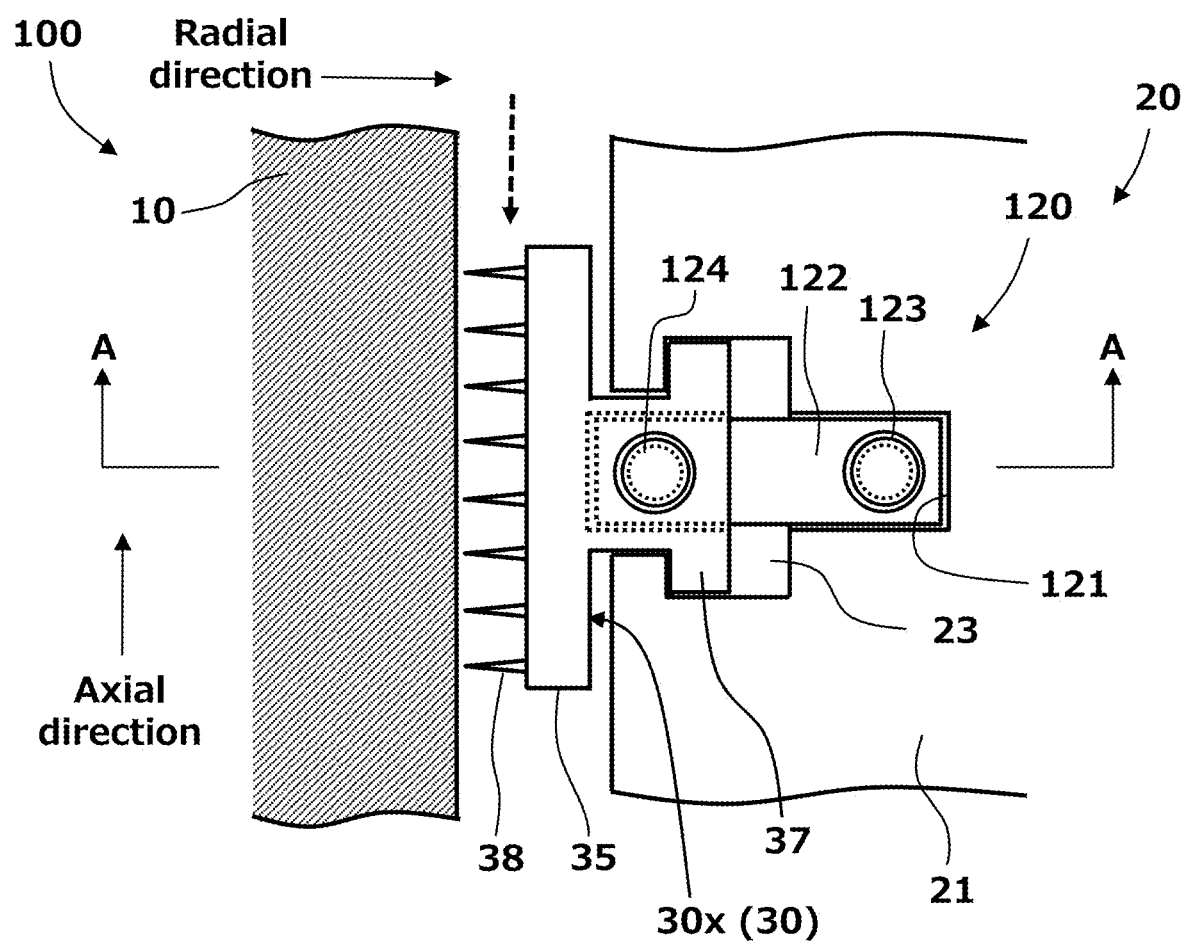
FIG. 5 is a partial horizontal sectional view illustrating a configuration of a target segment support structure of the turbine shaft sealing device according to the first embodiment.
Figure 6:
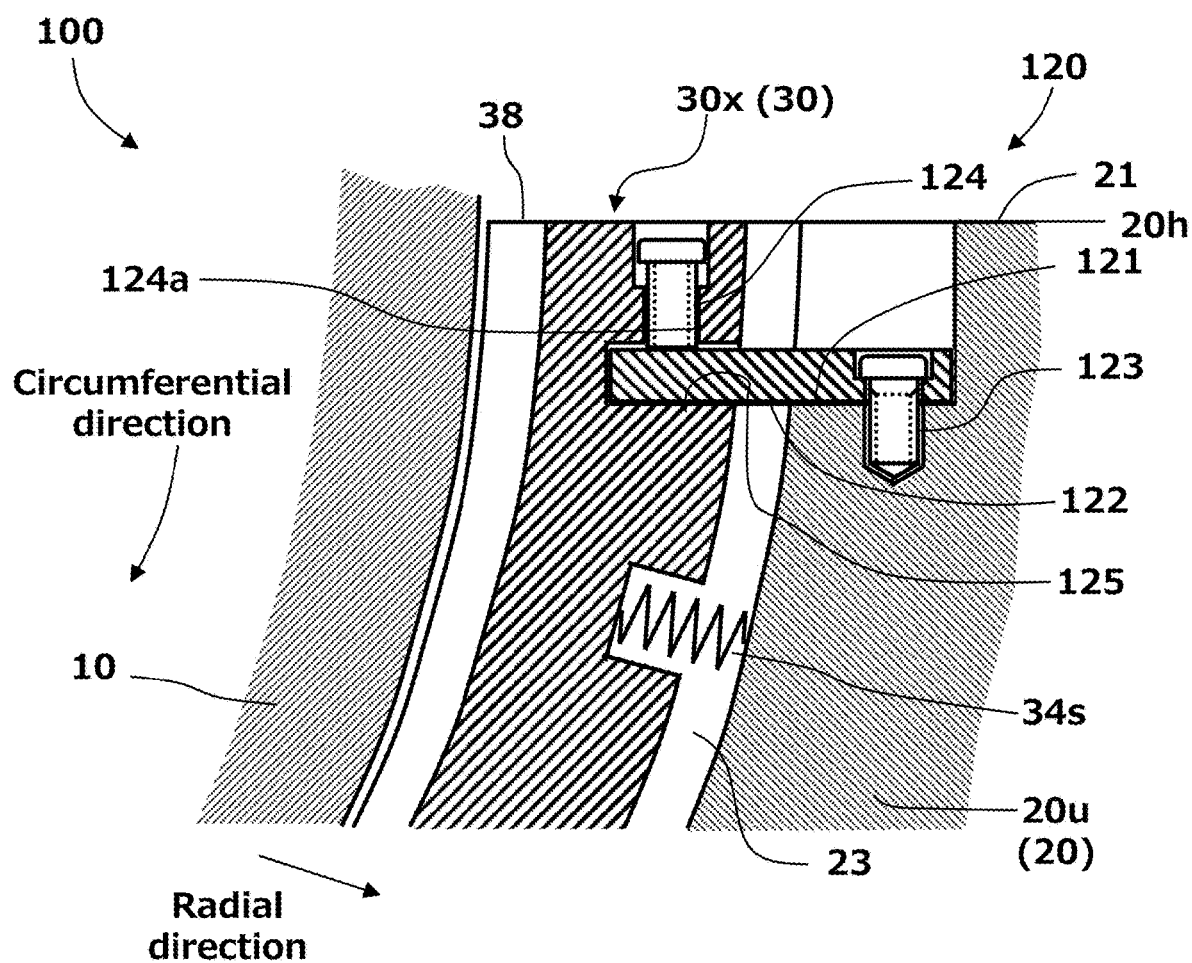
FIG. 6 is a partial sectional elevational view seen along arrows A-A in FIG. 5, illustrating the configuration of the target segment support structure of the turbine shaft sealing device according to the first embodiment.

FIG. 5 is a partial horizontal sectional view illustrating a configuration of the target segment support structure 120 of the turbine shaft sealing device 100 according to the first embodiment. Further, FIG. 6 is a partial sectional elevational view seen along arrows A-A in FIG. 5, illustrating the configuration of the target segment support structure 120 of the turbine shaft sealing device 100 according to the first embodiment. Note that an arrow mark of dotted line in FIG. 5 indicates a direction of a working fluid from an upstream side to a downstream side. This also similarly applies to later-described FIG. 8, FIG. 10, and FIG. 12.

The target segment support structure 120 has a stationary part cutout 121, a support plate 122, a stationary part setscrew 123, a height adjustment screw 124, and a support plate housing space 125.

The stationary part cutout 121 is formed on a lower half horizontal joint surface 21 being an upper surface of the lower half stationary part 20u of the stationary part 20. The stationary part cutout 121 is arranged at a predetermined depth from the lower half horizontal joint surface 21 in the circumferential direction, arranged on a radially outer side of the hook engagement annular groove 23 in the radial direction, and has a width in the axial direction capable of housing the support plate 122.

The support plate 122 is a load transfer element that transfers an own weight of the support target segment 30x to the lower half stationary part 20u. The support plate 122 is horizontally arranged in the stationary part cutout 121, and fixed to the lower half stationary part 20u by the stationary part setscrew 123.

Meanwhile, in the support target segment 30x out of the packing ring segments 30a, the support plate housing space 125 capable of housing the support plate 122 in the horizontal direction is formed. A depth of a bottom surface of the support plate housing space 125 is set to a depth same as a height of a bottom surface of the stationary part cutout 121 formed on the stationary part 20. Further, a height, namely, a width in the circumferential direction of the support plate housing space 125 has a dimension in which a span of adjustable range in the height direction of the support target segment 30x is added to a thickness of the support plate 122, or a dimension obtained by further adding a margin to the dimension.

On the support target segment 30x, a female screw 124a that penetrates from an upper surface to the support plate housing space 125, and screws together with the height adjustment screw 124 is formed.

By the above-described configuration, the support target segment 30x and the height adjustment screw 124 are integrated, and by the rotation of the height adjustment screw 124, a protrusion length of a tip of the height adjustment screw 124 toward the support plate housing space 125 changes. Further, the support plate 122 is fixed to the lower half stationary part 20u, and integrated with the lower half stationary part 20u.

Next, a support function of the support target segment 30x and an adjustment function of a height position of the support target segment 30x by the target segment support structure 120 as operations of the present embodiment, and effects thereof will be explained.

<Support Function of Support Target Segment 30x>

By the above-described configuration, the tip (lower end) of the height adjustment screw 124 that screws together with the support target segment 30x is brought into contact with the upper surface of the support plate 122 housed in the support plate housing space 125. Therefore, the support target segment 30x is prevented from moving in the vertically lower direction by the support plate 122. Further, the own weight of the support target segment 30x being the load in the vertically lower direction is transferred to the upper surface of the support plate 122 via the height adjustment screw 124. The support plate 122 is fixed to the lower half stationary part 20u by the stationary part setscrew 123, so that the load in the lower direction added to the upper surface of the support plate 122 is transferred to the lower half stationary part 20u. Specifically, the load in the vertical direction of the support target segment 30x is supported by the lower half stationary part 20u, and further, the displacement in the vertical direction of the support target segment 30x is restricted.

On the other hand, since the tip (lower end) of the height adjustment screw 124 that screws together with the support target segment 30x is only brought into contact with the upper surface of the support plate 122 housed in the support plate housing space 125, the displacement in the horizontal direction of the support target segment 30x is not restricted. As a result of this, the support target segment 30x is pressed toward the radially inner side by the spring force of the spring member 34s arranged between the support target segment 30x and the lower half stationary part 20u.

<Adjustment Function of Height Position of Support Target Segment 30x by Target Segment Support Structure 120>

As described above, the support target segment 30x is supported by the height adjustment screw 124 in the vertical direction. As a result of this, the height position of the support target segment 30x is determined by a relative position with the height adjustment screw 124. Here, by rotating the height adjustment screw 124, a position where the support target segment 30x and the height adjustment screw 124 are screwed together changes. Specifically, a protrusion length of the height adjustment screw 124 toward the support plate housing space 125 changes. A height position of the tip (lower end) of the height adjustment screw 124 is a height position at which the tip is brought into contact with the upper surface of the support plate 122, and thus it does not change. Therefore, when the protrusion length with respect to the support plate housing space 125 changes, the height position of the support target segment 30x changes.

<Effects of Second Characteristic Point>

An explanation will be made while referring to FIG. 3. Now, a case where the target segment support structure 120 is not provided, is assumed. A case is considered in which, in the above case, the rotary part 10 is brought into contact with the lower half center segment 31 and the segment is moved downward, and then the contact state is eliminated. When the target segment support structure 120 is not provided, the movement in the upper and lower direction of the lower half side segments 32 is not restricted, so that there can be considered a possibility of generating a state in which the lower half side segments 32 on both sides whose height position is relatively increased, lean on the lower half center segment 31 from both sides of the lower half center segment 31.

In such a state, there is a possibility that an end portion of the lower half side segment 32 and an end portion of the lower half center segment 31 are partially brought into contact with each other to hinder their smooth movements, resulting in that the lower half center segment 31 cannot return to its original position. As a result of this, the reduction in sealing performance is caused, which brings about the reduction in efficiency.

When the target segment support structure 120 is provided as the second characteristic point, even in a case where the rotary part 10 is brought into contact with the lower half center segment 31 and the segment is moved downward, and then the contact state is eliminated, the movement in the upper and lower direction of the lower half side segments 32 on both sides is restricted by the target segment support structure 120, so that the lower half center segment 31 can smoothly return to its original position.

Figure 7:
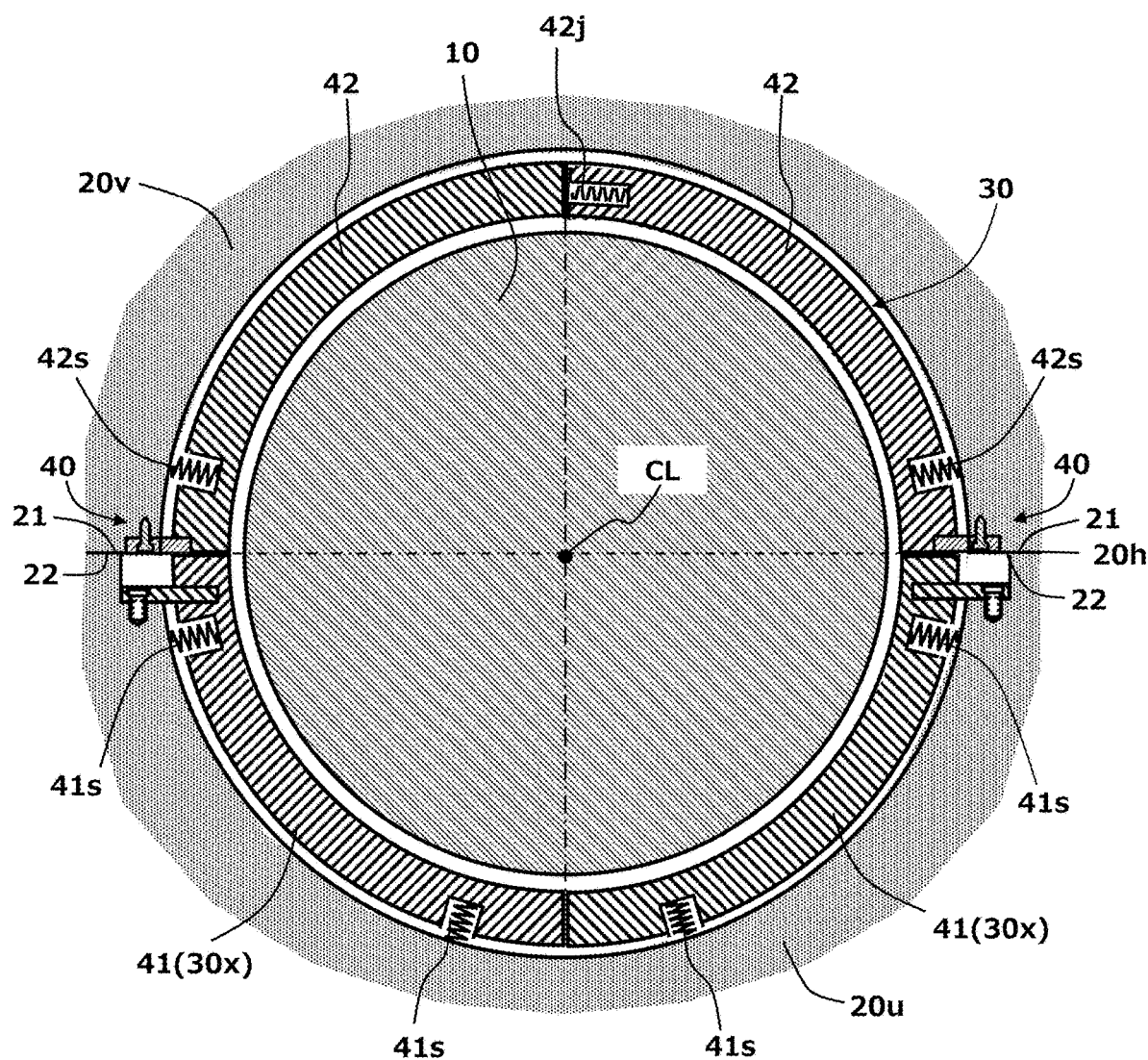
FIG. 7 is a transverse sectional view illustrating a configuration of a modified example of the turbine shaft sealing device according to the first embodiment.

FIG. 7 is a transverse sectional view illustrating a configuration of a modified example of the turbine shaft sealing device 100 according to the first embodiment.

The present modified example is an example in which the target segment support structure 120 is applied to a case where the packing ring 30 is divided into four packing ring segments 30a, in a similar manner to the prior art.

As illustrated in FIG. 7, the packing ring 30 is formed of four packing ring segments 30a divided in the circumferential direction. Concretely, the packing ring 30 is formed of two lower half segments 41 arranged below a horizontal dividing surface 20h of the stationary part 20, and two upper half segments 42 arranged above the horizontal dividing surface 20h of the stationary part 20. Each of these four segments has a circumferential angle of 90 degrees in the circumferential direction.

In each of the two lower half segments 41, lower half springs 41s that bias the lower half segment 41 toward the rotation center axis CL, are housed.

In each of the two upper half segments 42, an upper half spring 42s that biases the upper half segment 42 toward the rotation center axis CL, is housed. Further, in an end surface of one upper half segment 42 at a boundary with the other upper half segment 42, an upper half auxiliary spring 42j that operates in a direction of coupling the two upper half segments 42, is housed.

Figure 15:
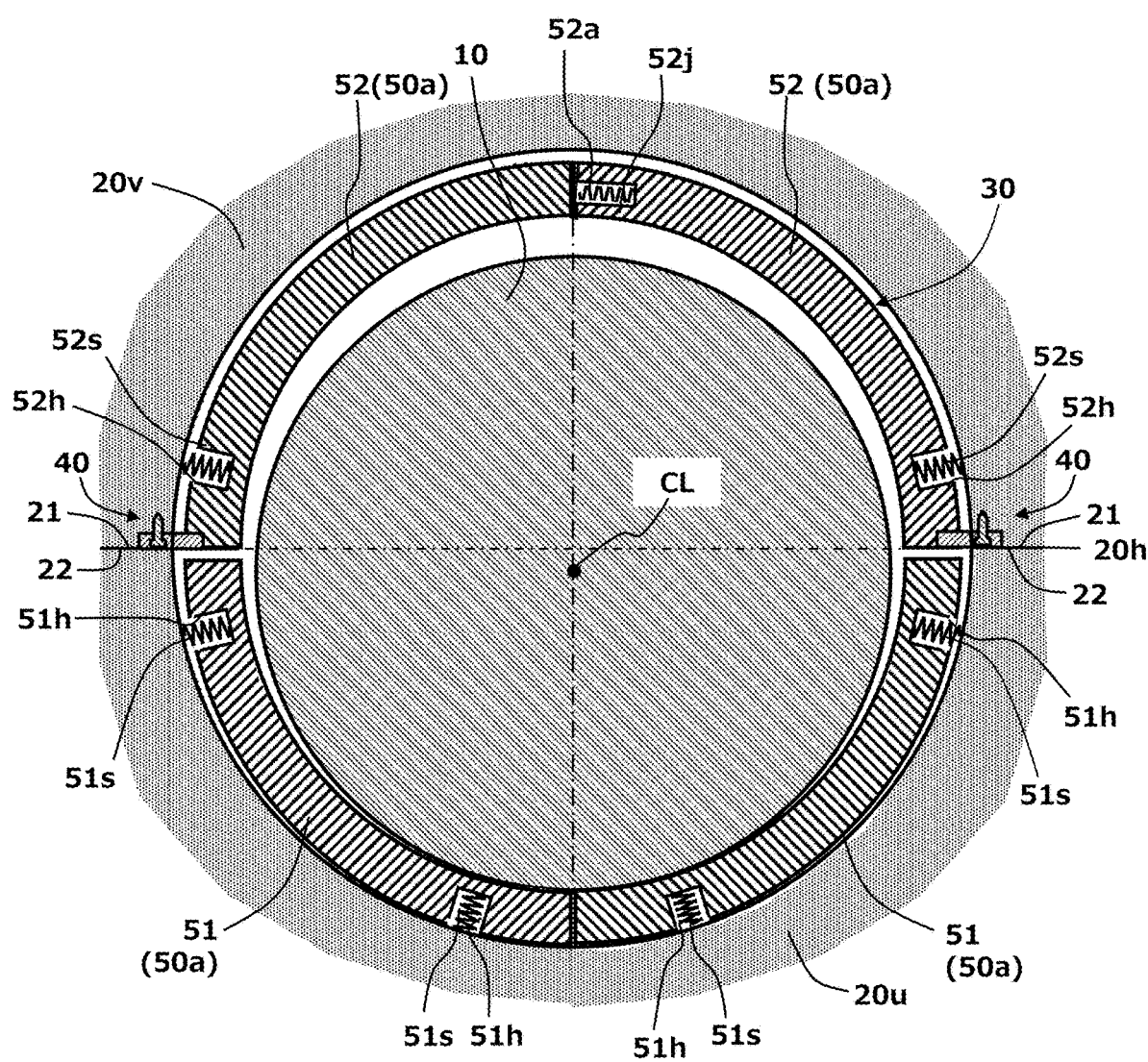
FIG. 15 is a transverse sectional view illustrating the conventional configuration example of the turbine shaft sealing device.

Biasing forces of the lower half spring 41s, the upper half spring 42s, and the upper half auxiliary spring 42j are respectively set in a similar manner to the conventional example illustrated in FIG. 15.

As described above, also in the case where the packing ring 30 is divided into four packing ring segments 30a, in a similar manner to the prior art, the target segment support structure 120 can obtain the effect similar to that in the case where the packing ring 30 is divided into six pieces, by setting the two lower half segments 41 to the support target segments 30x. Specifically, when the rotary part 10 is brought into contact with one or both of the two lower half segments 41 and then the contact state is eliminated, an upper end of the lower half segment 41 is supported by the target segment support structure 120, so that the segment does not move downward. Therefore, there is no chance that the lower half segment 41 moves in a direction of the other lower half segment 41 to prevent the other lower half segment 41 from returning to its original position.

Note that in FIG. 7, the case where the number of the lower half segments 41 is two is illustrated as an example, but not limited to this. Specifically, as long as the number of plural lower half segments connected in the circumferential direction is two or more, the embodiment is similarly applicable by setting, out of the lower half segments, two lower half segments adjacent to the lower half horizontal joint surface 21 to the target lower half segments.

As described above, in the turbine shaft sealing device 100 according to the present embodiment, by dividing the packing ring 30 into six (upper three and lower three) packing ring segments 30a, as the first characteristic point, when the rotary part 10 during operation is brought into contact with the packing ring segment 30a in the lower direction or the upper direction, the rotary part 10 is brought into only one packing ring segment 30a, resulting in that the reaction force from the packing ring segment 30a can be suppressed to a small force, which enables to suppress the local temperature increase of the rotary part 10 and suppress the vibration caused thereby.

Further, by providing the target segment support structure 120 as the second characteristic point, even in a case where the rotary part 10 is brought into contact with the lower half center segment 31 and the segment is moved downward, and then the contact state is eliminated, the movement in the upper and lower direction of the lower half side segments 32 on both sides is restricted by the target segment support structure 120, so that the lower half center segment 31 can smoothly return to its original position.

As described above, according to the present embodiment, the force that the rotary part 10 of the turbine receives when the rotary part 10 is brought into contact with the packing ring segment 30a can be reduced, which enables to suppress the shaft vibration of the rotary part 10. It is possible to bring about a large effect particularly in the start process or stop process of the turbine.

Second Embodiment

Figure 8:
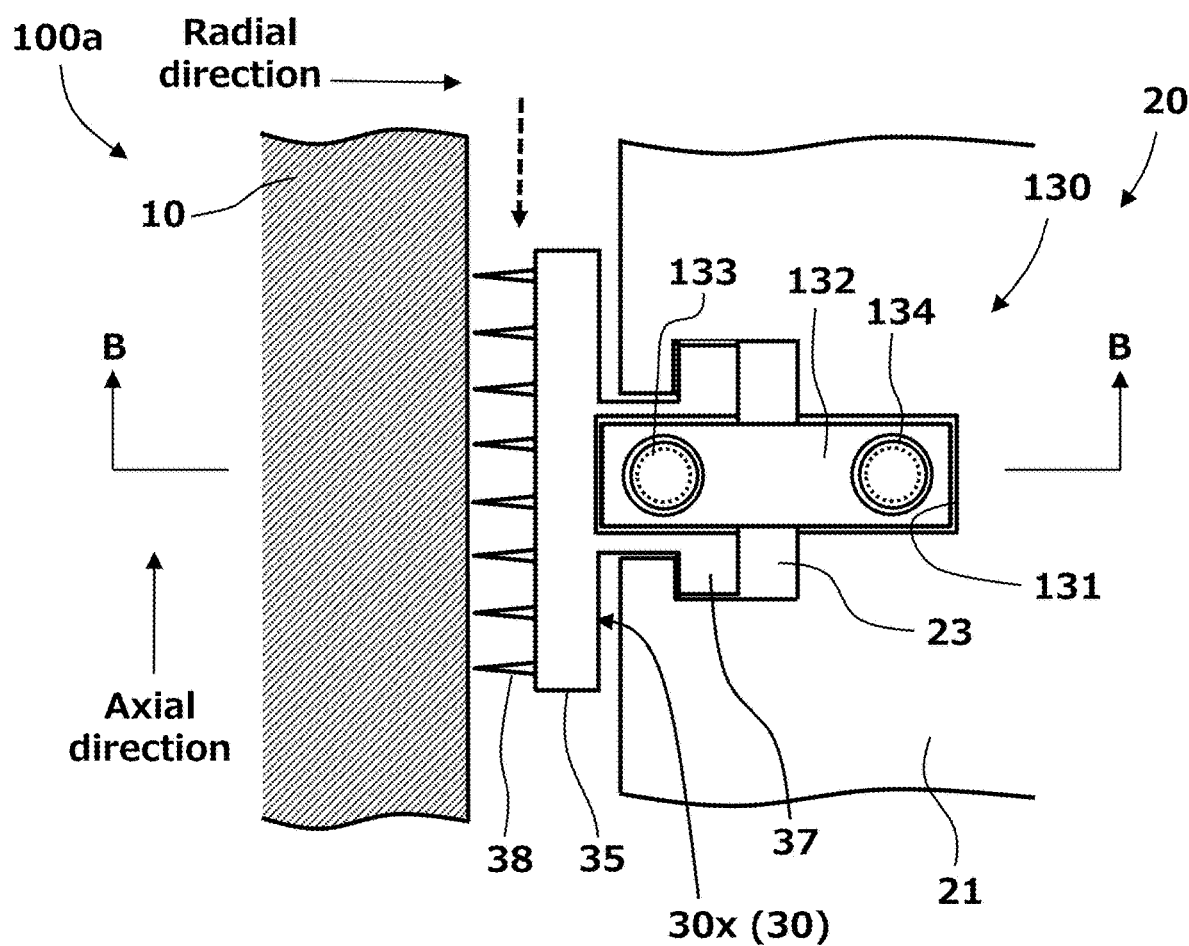
FIG. 8 is a partial horizontal sectional view illustrating a configuration of a target segment support structure of a turbine shaft sealing device according to a second embodiment.
Figure 9:
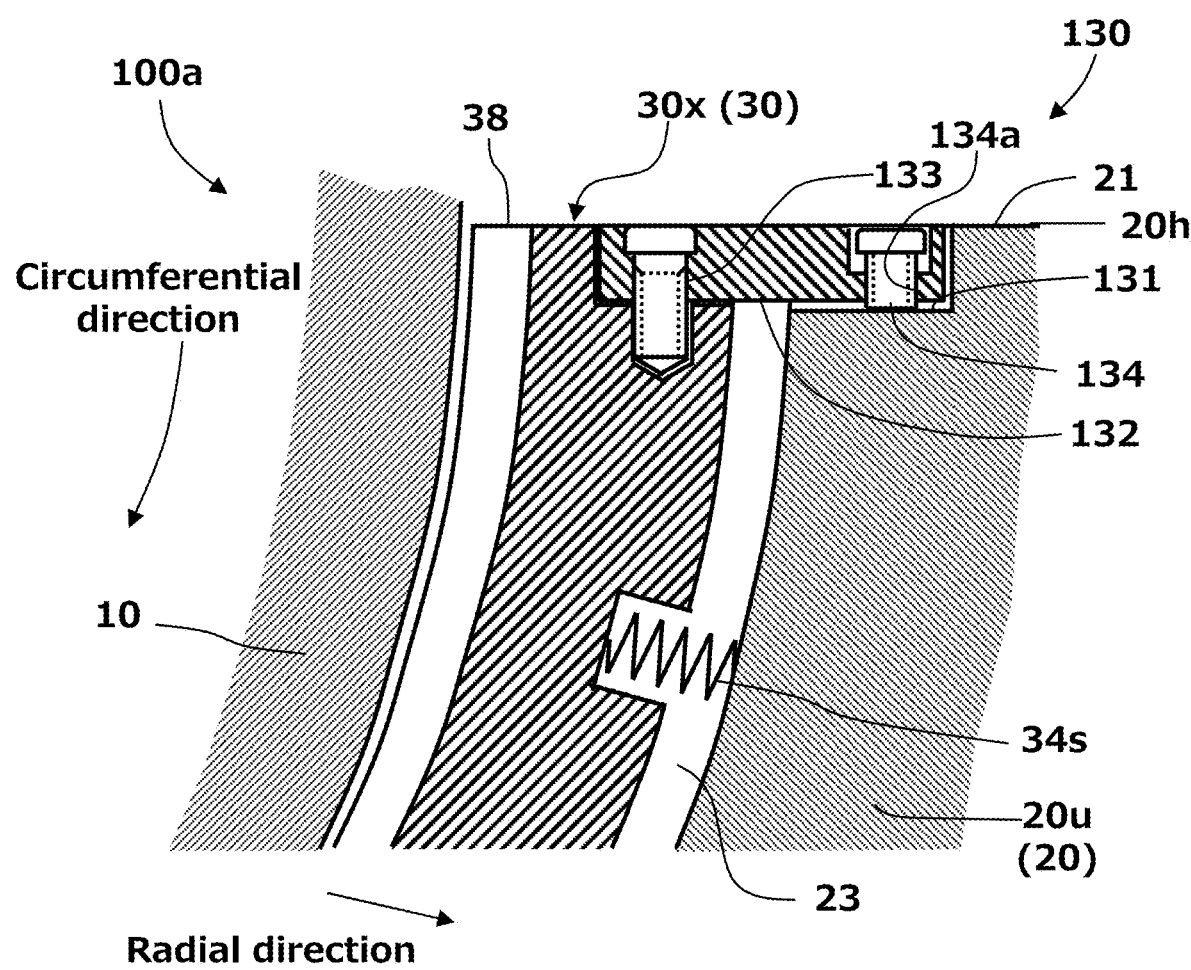
FIG. 9 is a partial sectional elevational view seen along arrows B-B in FIG. 8, illustrating the configuration of the target segment support structure of the turbine shaft sealing device according to the second embodiment.

FIG. 8 is a partial horizontal sectional view illustrating a configuration of a turbine shaft sealing device 100a according to a second embodiment. Further, FIG. 9 is a partial sectional elevational view seen along arrows B-B in FIG. 8, illustrating the configuration of the turbine shaft sealing device 100a according to the second embodiment.

The present embodiment is a modification of the first embodiment regarding the second characteristic point, and the turbine shaft sealing device 100a has a target segment support structure 130, in place of the target segment support structure 120 in the embodiment. Hereinafter, an explanation of parts common to those of the embodiment will be omitted, and the target segment support structure 130 will be explained.

The target segment support structure 130 has a stationary part cutout 131, a support plate 132, a segment setscrew 133, and a height adjustment screw 134.

The stationary part cutout 131 is formed on the lower half horizontal joint surface 21 being an upper surface of the lower half stationary part 20u of the stationary part 20. The stationary part cutout 131 is arranged at a predetermined depth from the lower half horizontal joint surface 21 in the circumferential direction, arranged on a radially outer side of the hook engagement annular groove 23 in the radial direction, and has a width in the axial direction capable of housing the support plate 132.

The support plate 132 is a load transfer element that transfers the own weight of the support target segment 30x to the lower half stationary part 20u, which is similar to the embodiment. The support plate 132 is horizontally arranged in the stationary part cutout 131, and coupled to the support target segment 30x by the segment setscrew 133.

On a portion of the support plate 132, mounted on the stationary part cutout 131, a female screw 134a that screws together with the height adjustment screw 134 is formed.

By the above-described configuration, the support target segment 30x and the segment setscrew 133 are integrated. By the rotation of the height adjustment screw 134, a protrusion length of a tip of the height adjustment screw 134 toward a bottom surface of the stationary part cutout 131 changes.

Next, a support function of the support target segment 30x and an adjustment function of a height position of the support target segment 30x by the target segment support structure 130 as operations of the present embodiment, and effects thereof will be explained.

<Support Function of Support Target Segment 30x>

By the above-described configuration, the tip (lower end) of the height adjustment screw 134 that screws together with the support plate 132 that is integrated with the support target segment 30x, is brought into contact with the bottom surface of the stationary part cutout 131. Therefore, the support target segment 30x is prevented from moving in the vertically lower direction by the height adjustment screw 134. Further, the own weight of the support target segment 30x being the load in the vertically lower direction is transferred to the height adjustment screw 134 via the segment setscrew 133 and the support plate 132. The load in the lower direction transferred to the height adjustment screw 134 is transferred to the bottom surface of the stationary part cutout 131, namely, the lower half stationary part 20u. Specifically, the load in the vertical direction of the support target segment 30x is supported by the lower half stationary part 20u, and further, the displacement in the vertical direction of the support target segment 30x is restricted.

On the other hand, since the tip (lower end) of the height adjustment screw 134 that screws together with the support plate 132 is only brought into contact with the bottom surface of the stationary part cutout 131, the displacement in the horizontal direction of the support target segment 30x is not restricted. As a result of this, the support target segment 30x is pressed toward the radially inner side by the spring force of the spring member 34s arranged between the support target segment 30x and the lower half stationary part 20u, as in the embodiment.

<Adjustment Function of Height Position of Support Target Segment 30x by Target Segment Support Structure 130>

As described above, the support target segment 30x is supported by the height adjustment screw 134 in the vertical direction. As a result of this, the height position of the support target segment 30x is determined by a relative position with the height adjustment screw 134. Here, by rotating the height adjustment screw 134, a position where the support plate 132 and the height adjustment screw 134 are screwed together changes. Specifically, the protrusion length of the height adjustment screw 134 toward the bottom surface of the stationary part cutout 131 changes. A height position of the tip (lower end) of the height adjustment screw 134 is a depth position of the bottom surface of the stationary part cutout 131, and thus it does not change. Therefore, when the protrusion length with respect to the bottom surface of the stationary part cutout 131 changes, the height position of the support target segment 30x changes.

<Effects>

As described above, the target segment support structure 130 in the present embodiment can restrict the support target segment 30x in the upper and lower direction and adjust the restriction position in the upper and lower direction, and brings about effects similar to those of the target segment support structure 120 in the first embodiment.

Third Embodiment

Figure 10:
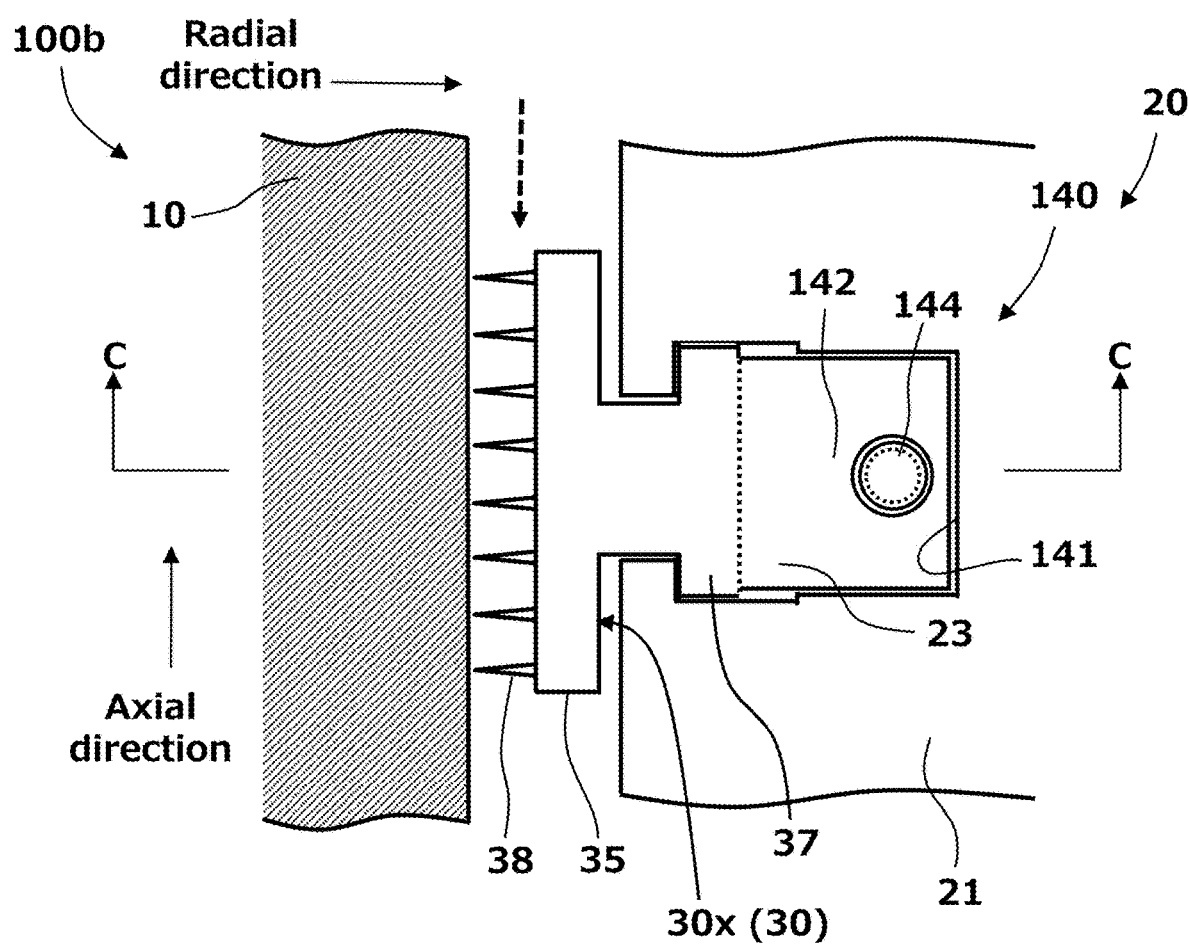
FIG. 10 is a partial horizontal sectional view illustrating a configuration of a target segment support structure of a turbine shaft sealing device according to a third embodiment.
Figure 11:
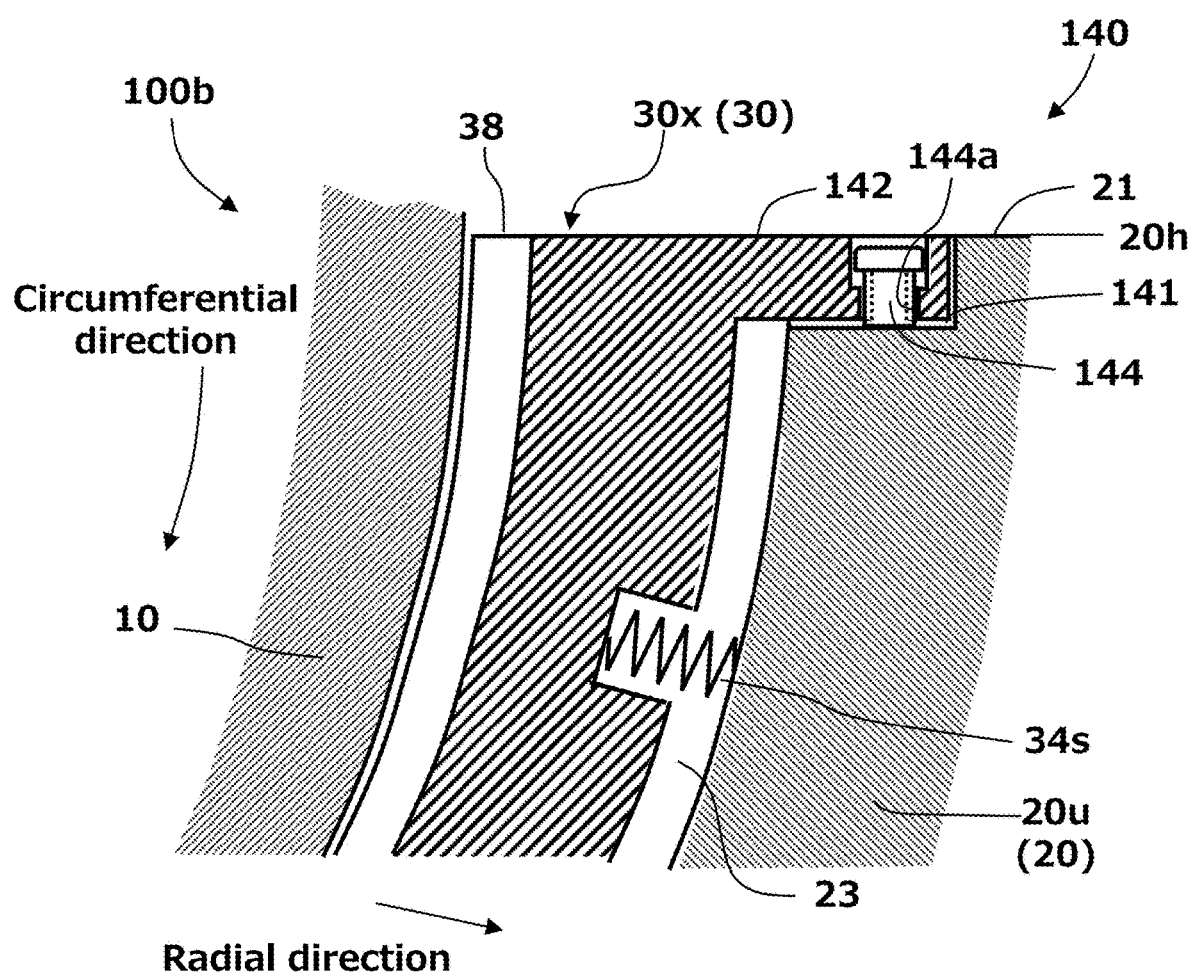
FIG. 11 is a partial sectional elevational view seen along arrows C-C in FIG. 10, illustrating the configuration of the target segment support structure of the turbine shaft sealing device according to the third embodiment.

FIG. 10 is a partial horizontal sectional view illustrating a configuration of a turbine shaft sealing device 100b according to a third embodiment. Further, FIG. 11 is a partial sectional elevational view seen along arrows C-C in FIG. 10, illustrating the configuration of the turbine shaft sealing device 100b according to the third embodiment.

The present embodiment is a modification of the first embodiment regarding the second characteristic point, and the turbine shaft sealing device 100b has a target segment support structure 140, in place of the target segment support structure 120 in the embodiment. Hereinafter, an explanation of parts common to those of the embodiment will be omitted, and the target segment support structure 140 will be explained.

The target segment support structure 140 has a stationary part cutout 141, a segment extended plate portion 142, and a height adjustment screw 144.

The stationary part cutout 141 is formed on the lower half horizontal joint surface 21 being an upper surface of the lower half stationary part 20u of the stationary part 20. The stationary part cutout 141 is arranged at a predetermined depth from the lower half horizontal joint surface 21 in the circumferential direction, arranged on a radially outer side of the hook engagement annular groove 23 in the radial direction, and has a width in the axial direction same as a width in the axial direction of the hook engagement annular groove 23.

The support target segment 30x of the present embodiment has the segment extended plate portion 142 being the uppermost portion thereof extended toward the radially outer side. The segment extended plate portion 142 may be attached to the support target segment 30x by welding, for example, or it may also be integrally manufactured and worked as a part of the support target segment 30x. The segment extended plate portion 142 is mounted on a bottom surface of the stationary part cutout 141. On the segment extended plate portion 142, a female screw 144a that screws together with the height adjustment screw 144 is formed.

Based on the above-described configuration, by the rotation of the height adjustment screw 144, a protrusion length of a tip of the height adjustment screw 144 toward the bottom surface of the stationary part cutout 141 changes.

Next, a support function of the support target segment 30x and an adjustment function of a height position of the support target segment 30x by the target segment support structure 140 as operations of the present embodiment, and effects thereof will be explained.

By the above-described configuration, the tip (lower end) of the height adjustment screw 144 that screws together with the segment extended plate portion 142 being a part of the support target segment 30x, is brought into contact with the bottom surface of the stationary part cutout 141. Therefore, also in the present embodiment, the support target segment 30x is prevented from moving in the vertically lower direction by the height adjustment screw 144, to thereby restrict the displacement of the segment in the vertical direction, and the load in the vertical direction of the support target segment 30x is supported by the lower half stationary part 20u. Further, in a similar manner to the first embodiment, the support target segment 30x is pressed toward the radially inner side by the spring force of the spring member 34s arranged between the support target segment 30x and the lower half stationary part 20u. In addition, in a similar manner to the first embodiment, when the protrusion length toward the bottom surface of the stationary part cutout 141 changes, the height position of the support target segment 30x changes.

<Effects>

As described above, the target segment support structure 140 in the present embodiment can restrict the support target segment 30x in the upper and lower direction and adjust the restriction position in the upper and lower direction, and brings about effects similar to those of the target segment support structure 120 in the first embodiment.

Besides, in the present embodiment, the segment extended plate portion 142 is integrated with the support target segment 30x, so that there is no need to provide a member for coupling such as the stationary part setscrew 123 in the embodiment or the segment setscrew 133 in the second embodiment.

Fourth Embodiment

Figure 12:
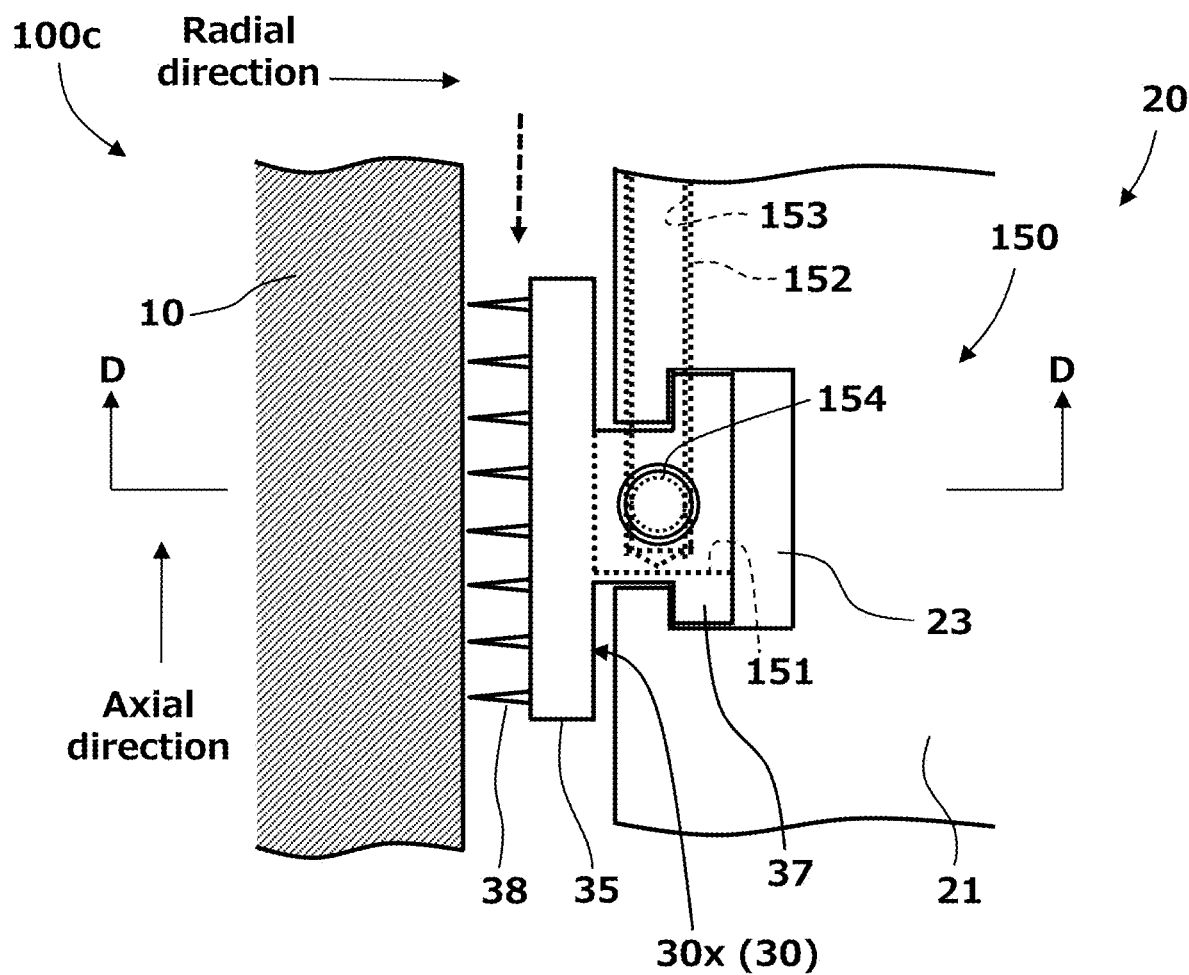
FIG. 12 is a partial horizontal sectional view illustrating a configuration of a target segment support structure of a turbine shaft sealing device according to a fourth embodiment.
Figure 13:
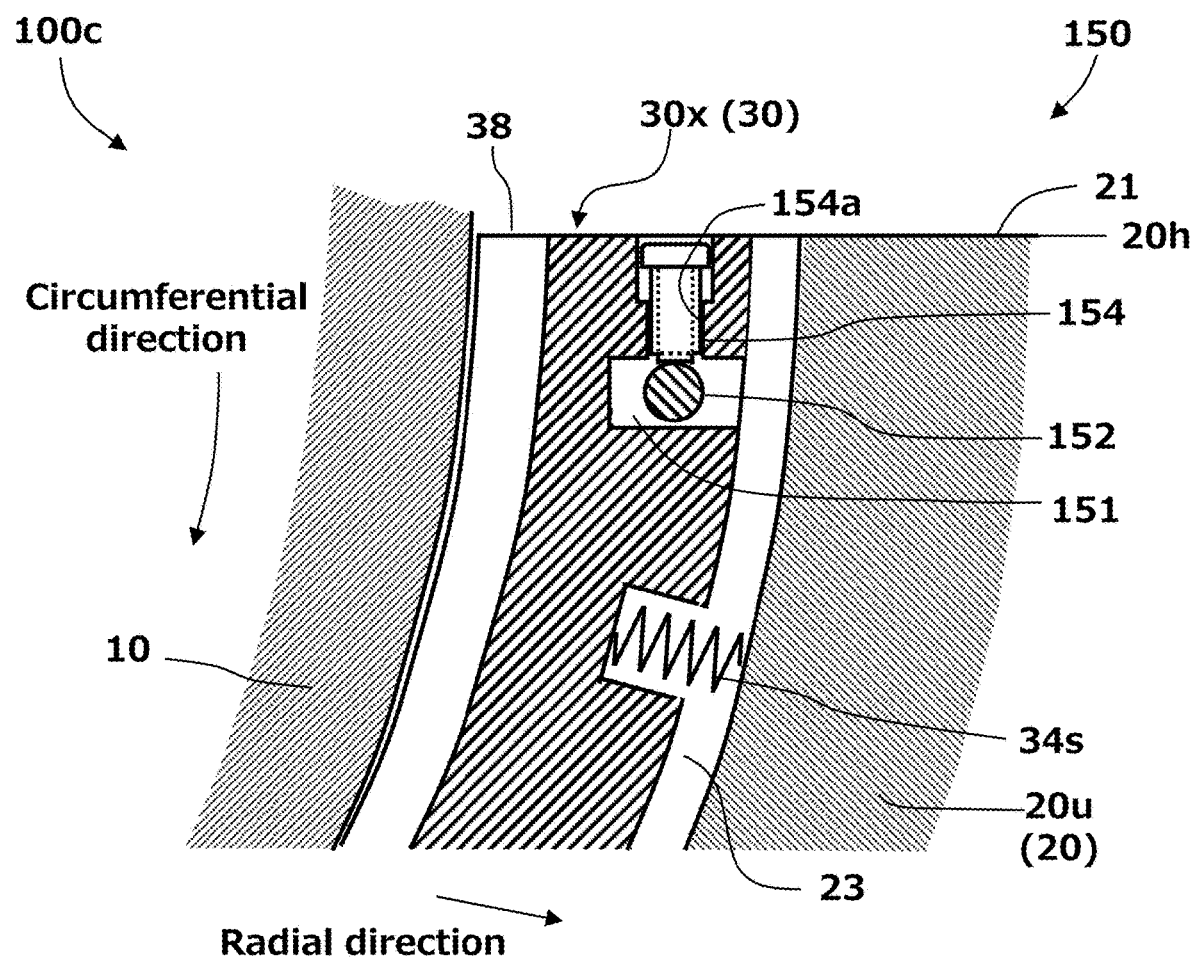
FIG. 13 is a partial sectional elevational view seen along arrows D-D in FIG. 12, illustrating the configuration of the target segment support structure of the turbine shaft sealing device according to the fourth embodiment.

FIG. 12 is a partial horizontal sectional view illustrating a configuration of a turbine shaft sealing device 100c according to a fourth embodiment. Further, FIG. 13 is a partial sectional elevational view seen along arrows D-D in FIG. 12, illustrating the configuration of the turbine shaft sealing device 100c according to the fourth embodiment.

The present embodiment is a modification of the first embodiment regarding the second characteristic point, and the turbine shaft sealing device 100c has a target segment support structure 150, in place of the target segment support structure 120 in the embodiment. Hereinafter, an explanation of parts common to those of the embodiment will be omitted, and the target segment support structure 150 will be explained.

The target segment support structure 150 has a support rod housing groove 151, a support rod 152, and a height adjustment screw 154. Note that in the present embodiment, a support rod housing hole in stationary part 153 is formed, not on the stationary part cutout 121 in the embodiment, but on the lower half stationary part 20u, in order to support the support rod 152 that is horizontal toward the circumferential direction. Further, the support rod housing groove 151 is formed on the support target segment 30x so that the support rod 152 penetrates horizontally without being brought into contact with the support target segment 30x. Specifically, the support rod housing groove 151 extends in the circumferential direction and is enlarged toward the radially outer side in the support target segment 30x.

At a portion on the upper side of the support rod housing groove 151, and above the support rod 152 in the radial direction of the support target segment 30x, a female screw 154a that screws together with the height adjustment screw 154 in the vertical direction is formed.

By the above-described configuration, the height adjustment screw 154 is integrated with the support target segment 30x. A tip of the height adjustment screw 154 integrated with the support target segment 30x is brought into contact with a side surface on the upper side of the support rod 152, and the own weight of the support target segment 30x is transferred to the support rod 152 and supported by the lower half stationary part 20u.

In a similar manner to the first embodiment, when the protrusion length of the adjustment screw 154 toward the support rod 152 side changes, the height position of the support target segment 30x changes.

<Effects>

As described above, the target segment support structure 150 in the present embodiment can restrict the support target segment 30x in the upper and lower direction and adjust the restriction position in the upper and lower direction, and brings about effects similar to those of the target segment support structure 120 in the first embodiment.

According to the embodiments explained above, it becomes possible to provide the turbine shaft sealing device capable of reducing the force that the rotary part of the turbine receives when the rotary part is brought into contact with the packing ring segment, and thereby suppressing the shaft vibration of the rotary part.

Other Embodiments

Although the embodiments of the present invention have been described above, the embodiments have been presented by way of example only, and are not intended to limit the scope of the inventions. Further, the characteristics of the respective embodiments may also be combined. Furthermore, the embodiments may be embodied in a variety of other forms, and various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. A turbine shaft sealing device provided in a turbine for suppressing leakage of a working fluid between a rotary part that rotates around a rotation center axis by the working fluid, and a lower half stationary part and an upper half stationary part that are arranged to annularly surround the rotary part and that adhere to each other at respective horizontal joint surfaces, the turbine shaft sealing device comprising:

a packing ring lower half part and a packing ring upper half part configuring an annular packing ring having a hook and an inner peripheral ring part, the hook engaging with a hook engagement annular groove that is formed along a circumferential direction on the lower half stationary part and the upper half stationary part, the inner peripheral ring part having at least one seal fin that protrudes toward a surface of the rotary part and that is formed along the circumferential direction, wherein:

the packing ring lower half part is stationarily supported by the lower half stationary part;

the packing ring lower half part has:

a lower half center segment arranged at a center in the circumferential direction of the lower half; and two lower half side segments arranged on both sides in the circumferential direction of the lower half center segment, and each having one circumferential end portion facing a circumferential end portion of the lower half center segment;

the packing ring upper half part is stationarily supported by the upper half stationary part;

the packing ring upper half part has:

an upper half center segment arranged at a center portion in the circumferential direction of the upper half; and two upper half side segments arranged on both sides in the circumferential direction of the upper half center segment, and each having one circumferential end portion facing a circumferential end portion of the upper half center segment, and the other end portion supported by a support plate provided to the horizontal joint surface of the upper half stationary part; and the turbine shaft sealing device further comprises:

a lower half center biasing part to perform biasing the lower half center segment toward a radially inner side;

a lower half side biasing part to perform biasing each of the two lower half side segments toward the radially inner side;

an upper half side biasing part to perform biasing each of the two upper half side segments toward the radially inner side; and two upper half center biasing part that are provided between the upper half center segment and the respective two upper half side segments, and that is configured to perform biasing toward the upper half center segment in a direction of making the upper half center segment and the respective two upper half side segments adhere to each other, the turbine shaft sealing device further including a target segment support structure that is provided between each of the two lower half side segments set as a target lower half segment and the lower half stationary part to support the lower half side segment, and that has a height adjustment part capable of adjusting a relative position in an upper and lower direction between the lower half stationary part and the lower half side segment, wherein:

the lower half stationary part has a stationary part cutout formed on a first upper end surface thereof;

the target lower half segment has a female screw formed on a second upper end surface thereof;

the target segment support structure has a support plate housed in the stationary part cutout and horizontally fixed to the lower half stationary part;

the height adjustment part has an adjustment screw capable of supporting a weight of the target lower half segment by screwing together with the female screw formed on the target lower half segment;

the target lower half segment has a receiving hole formed in a horizontal direction from a side surface, for housing the support plate;

the support plate is housed in the receiving hole; and a tip of the female screw can press an upper surface of the support plate.

2. The turbine shaft sealing device according to claim 1, wherein:

a biasing force with respect to the lower half center segment is larger by a predetermined first minute value than a force of supporting a weight of the lower half center segment; and a biasing force of the two upper half center biasing part with respect to the upper half center segment is smaller by a predetermined second minute value than a force of separating the upper half center segment and the two upper half side segments.

3. The turbine shaft sealing device according to claim 1, wherein in a transverse section perpendicular to the rotation center axis, a circumferential angle between both ends in the circumferential direction of the lower half center segment is set to an angle at which, even when the rotary part is brought into contact with a center portion in the circumferential direction of the lower half center segment and the lower half center segment is moved toward a radially outer side, the rotary part is not brought into contact with the lower half side segment.

4. The turbine shaft sealing device according to claim 1, wherein in a transverse section perpendicular to the rotation center axis, a circumferential angle between both ends in the circumferential direction of the upper half center segment is set to an angle at which, even when the rotary part is brought into contact with a center portion in the circumferential direction of the upper half center segment and the upper half center segment is moved toward a radially outer side, the rotary part is not brought into contact with the upper half side segment.

* * * * *